United States Patent
Ito

(10) Patent No.: US 11,410,036 B2
(45) Date of Patent: Aug. 9, 2022

(54) ARITHMETIC PROCESSING APPARATUS, CONTROL METHOD, AND NON-TRANSITORY COMPUTER-READABLE RECORDING MEDIUM HAVING STORED THEREIN CONTROL PROGRAM

(71) Applicant: FUJITSU LIMITED, Kawasaki (JP)

(72) Inventor: Makiko Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 249 days.

(21) Appl. No.: 16/898,493

(22) Filed: Jun. 11, 2020

(65) Prior Publication Data
US 2021/0012192 A1  Jan. 14, 2021

(30) Foreign Application Priority Data

Jul. 11, 2019 (JP) .............................. JP2019-129368

(51) Int. Cl.
*G06F 3/08* (2006.01)
*G06N 3/08* (2006.01)
(Continued)

(52) U.S. Cl.
CPC ........... *G06N 3/08* (2013.01); *G06F 7/49915* (2013.01); *G06F 7/49942* (2013.01); *G06F 7/57* (2013.01);
(Continued)

(58) Field of Classification Search
CPC ............ G06N 3/08; G06N 3/04; G06N 3/063; G06N 3/0454; G06F 7/49915;
(Continued)

(56) References Cited

U.S. PATENT DOCUMENTS

2001/0025292 A1 * 9/2001 Denk ................... G06F 7/49942
                                                        708/550
2017/0061279 A1   3/2017 Yang et al.
(Continued)

FOREIGN PATENT DOCUMENTS

EP   3474132 A1 * 4/2019 .......... G06F 11/3452
EP   3474132 A1   4/2019
(Continued)

OTHER PUBLICATIONS

Extended European Search Report dated Nov. 17, 2020 for corresponding European Patent Application No. 20179301.5, 8 pages.
European Office Action dated May 6, 2022 for corresponding European Patent Application No. 20179301.5, 6 pages.

*Primary Examiner* — Farley Abad
(74) *Attorney, Agent, or Firm* — Fujitsu Patent Center

(57) ABSTRACT

An arithmetic processing apparatus includes: a memory that stores, when a training of a given machine learning model is repeatedly performed in a plurality of iterations, an error of a decimal point position of each of a plurality of fixed-point number data obtained one in each of the plurality of iterations, the error being obtained based on statistical information related to a distribution of leftmost set bit positions for positive number and leftmost unset bit positions for negative number or a distribution of rightmost set bit positions of the plurality of fixed-point number data; and a processor coupled to the memory, the processor being configured to: determine, based on a tendency of the error in each of the plurality of iterations, an offset amount for correcting a decimal point position of fixed-point number data used in the training.

21 Claims, 32 Drawing Sheets

(51) Int. Cl.
    *G06F 7/499*     (2006.01)
    *G06F 7/57*     (2006.01)
    *G06F 9/30*     (2018.01)
    *G06K 9/62*     (2022.01)
    *G06N 3/04*     (2006.01)

(52) U.S. Cl.
    CPC ......... *G06F 9/3001* (2013.01); *G06K 9/6256* (2013.01); *G06N 3/04* (2013.01)

(58) Field of Classification Search
    CPC ...... G06F 7/49942; G06F 7/57; G06F 9/3001; G06F 7/499; G06K 9/6256
    See application file for complete search history.

(56) References Cited

U.S. PATENT DOCUMENTS

| | | |
|---|---|---|
| 2019/0114142 A1 | 4/2019 | Yoda et al. |
| 2019/0251429 A1* | 8/2019 | Du ........................ G06N 3/0454 |
| 2019/0339939 A1 | 11/2019 | Ito et al. |
| 2019/0370682 A1 | 12/2019 | Yoda |

FOREIGN PATENT DOCUMENTS

| | | |
|---|---|---|
| JP | H07-084975 A | 3/1995 |
| JP | H07-134600 A | 5/1995 |
| JP | 2018-124681 A | 8/2018 |
| JP | 6528884 B1 | 6/2019 |

\* cited by examiner

FIG.2

DATA FOR LEARNING

| DATA ID | INPUT DATA | CORRECT ANSWER DATA |
|---------|------------|---------------------|
| 00001   | A1         | B1                  |
| 00002   | A2         | B2                  |
| ...     | ...        | ...                 |
| S       | AS         | BS                  |

FIG.5

| ITERATION NUMBER i | PARAMETER $W_1$ | ... | PARAMETER $W_L$ | ... | PARAMETER $W_N$ |
|---|---|---|---|---|---|
| 1 | $W_1(1)$ | ... | $W_L(1)$ | ... | $W_N(1)$ |
| 2 | $W_1(2)$ | ... | $W_L(2)$ | ... | $W_N(2)$ |
| ... | ... | ... | ... | ... | ... |
| M | $W_1(M)$ | ... | $W_L(M)$ | ... | $W_N(M)$ |

EXAMPLE OF HISTOGRAM EXPRESSING DISTRIBUTION
OF LEFTMOST SET BIT POSITION FOR POSITIVE NUMBER AND
LEFTMOST UNSET BIT POSITION FOR NEGATIVE NUMBER

FIG.15

| ITERATION NUMBER i | LAYER 1 | | ... | LAYER L | | ... | LAYER N | |
|---|---|---|---|---|---|---|---|---|
| | DIFFERENCE VALUE | FEATURE VALUE | | DIFFERENCE VALUE | FEATURE VALUE | | DIFFERENCE VALUE | FEATURE VALUE |
| t−1 | 1 | 3 | ... | 1 | 2 | ... | 1 | 2 |
| t | 0 | 1 | ... | −1 | −1 | ... | −1 | −1 |

| | conv 1_1 | conv 1_2 | conv 2_1 | conv 2_2 | conv 3_1 | conv 3_2 | conv 3_3 | conv 3_4 | conv 4_1 | conv 4_2 | conv 4_3 | conv 4_4 | conv 5_1 | conv 5_2 | conv 5_3 | conv 5_4 | conv5_4 PREDICTED VALUE | T/F |
|---|---|---|---|---|---|---|---|---|---|---|---|---|---|---|---|---|---|---|
| 8908 | 0 | 0 | 0 | 0 | 0 | 0 | 0 | 0 | -1 | 0 | 0 | -1 | 0 | 1 | 0 | 1 | 1 | TRUE |
| 8909 | 0 | 0 | 0 | -1 | 0 | -2 | -1 | -1 | 0 | -1 | -1 | -1 | 0 | 0 | 0 | 0 | 0 | |
| 8910 | 0 | 0 | 0 | 0 | 0 | 1 | 0 | 1 | 0 | 1 | 1 | 1 | 0 | 0 | 0 | 0 | 0 | |
| 8911 | 0 | 0 | 0 | 0 | 0 | 0 | 0 | 0 | 0 | 0 | -1 | 0 | 0 | 0 | 0 | 0 | 0 | |
| 8912 | 0 | 0 | 0 | 1 | 0 | 1 | 1 | 0 | 1 | 0 | 1 | 0 | 0 | -1 | 0 | -1 | -1 | TRUE |
| 8913 | 0 | 0 | 0 | 0 | 0 | 0 | 0 | -1 | -1 | 0 | -1 | 0 | 0 | 0 | 1 | 1 | 0 | |
| 8914 | 0 | 0 | -1 | -1 | 0 | -1 | -1 | 0 | 0 | -1 | 0 | 0 | 0 | 0 | 0 | 0 | 0 | |
| 8915 | 0 | 0 | 1 | 1 | 0 | 2 | 1 | 1 | 1 | 1 | 1 | 0 | 0 | 0 | 0 | -1 | -1 | FALSE |
| 8916 | 0 | 0 | 0 | 0 | 0 | 0 | 0 | 0 | 0 | 0 | 0 | 0 | 0 | 0 | -1 | 0 | 0 | |
| 8917 | 0 | 0 | 0 | 0 | 0 | 0 | 0 | 0 | 0 | 0 | 0 | 0 | 0 | 0 | 1 | 1 | 1 | TRUE |

CASE FORWARD PROPAGATION

: CORRECTED RIGHTLY
: PREDICTED THAT CORRECTION VALUE IS NOT REQUIRED
: PREDICTED WRONG CORRECTION VALUE

FIG.25

| ITERATION NUMBER i | LAYER 1 | | ... | LAYER L | | ... | LAYER N | |
|---|---|---|---|---|---|---|---|---|
| | DIFFERENCE VALUE | FEATURE VALUE | | DIFFERENCE VALUE | FEATURE VALUE | | DIFFERENCE VALUE | FEATURE VALUE |
| t | 0 | 1 | ... | 1 | 1 | ... | 1 | 1 |

FIG.26

| ITERATION NUMBER i | LAYER 1 | | ... | LAYER L-1 | | ... | LAYER L | | ... | LAYER N | |
|---|---|---|---|---|---|---|---|---|---|---|---|
| | DIFFERENCE VALUE | FEATURE VALUE | | DIFFERENCE VALUE | FEATURE VALUE | | DIFFERENCE VALUE | FEATURE VALUE | | DIFFERENCE VALUE | FEATURE VALUE |
| t | 1 | 2 | ... | 0 | 2 | | | | ... | | |

LAYERS (1 TO (L-1)) PREVIOUS TO LAYER (L)

ARITHMETIC PROCESSING APPARATUS, CONTROL METHOD, AND NON-TRANSITORY COMPUTER-READABLE RECORDING MEDIUM HAVING STORED THEREIN CONTROL PROGRAM

CROSS-REFERENCE TO RELATED APPLICATION

This application is based upon and claims the benefit of priority of the prior Japanese Patent application No. 2019-129368, filed on Jul. 11, 2019, the entire contents of which are incorporated herein by reference.

FIELD

The embodiments discussed herein are directed to an arithmetic processing apparatus, a control method, and a non-transitory computer-readable recording medium having stored therein a control program.

BACKGROUND

In an arithmetic processing apparatus, there is known a method for adjusting the decimal point position of fixed-point number data on the basis of statistical information on the distribution of bits in the data after being subjected to execution of an instruction directed to the fixed-point number data. This method makes it possible to execute, for example, the calculating process related to deep learning with high accuracy by means of a fixed-point number to thereby reduce the circuit scale and the power consumption.

[Patent Document 1] Japanese Laid-open Patent Publication No. 07-84975
[Patent Document 2] Japanese Laid-open Patent Publication No. 07-134600
[Patent Document 3] Japanese Laid-open Patent Publication No. 2018-124681

When the arithmetic processing apparatus is caused to learn the parameters of machine learning models such as neural networks, gaps may be generated between a decimal point position estimated on the basis of statistical information of the learning and actual distributions of parameters and output data.

If such gaps are generated, the updating of the decimal point position on the basis of the statistical information may increase a quantization error due to the saturation or rounding of the fixed point as compared with the case where the gaps are small, and the learning becomes unstable, in other words, the accuracy of a learning result may be lowered.

SUMMARY

According to an aspect of the embodiments, an arithmetic processing apparatus includes: a memory that stores, when a training of a given machine learning model is repeatedly performed in a plurality of iterations, an error of a decimal point position of each of a plurality of fixed-point number data obtained one in each of the plurality of iterations, the error being obtained based on statistical information related to a distribution of leftmost set bit positions for positive number and leftmost unset bit positions for negative number or a distribution of rightmost set bit positions of the plurality of fixed-point number data; and a processor coupled to the memory, the processor being configured to: determine, based on a tendency of the error in each of the plurality of iterations, an offset amount for correcting a decimal point position of fixed-point number data used in the training.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of data stored in a data storing unit;

FIG. 5 is a diagram illustrating an example of updating information that a parameter storing unit stores;

FIG. 15 is a diagram illustrating an example of information stored in an information storing unit;

FIG. 25 is a diagram illustrating an example of information stored in an information storing unit;

FIG. 26 is a diagram illustrating an example of a correction process of a decimal point position;

DESCRIPTION OF EMBODIMENT(S)

Figure 1:
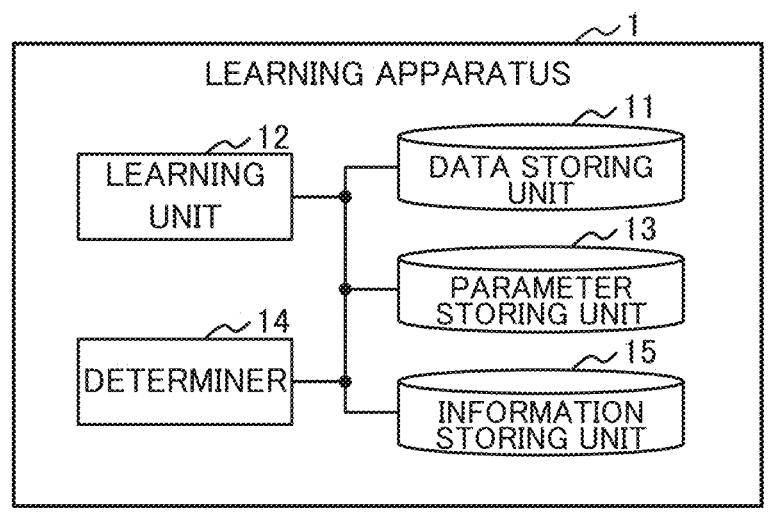
FIG. 1 is a block diagram schematically illustrating an example of the functional configuration of a learning apparatus according to a first embodiment.

Hereinafter, embodiments of the present invention will now be described with reference to the accompanying drawings. However, the embodiments described below are merely illustrative and is not intended to exclude the application of various modifications and techniques not explicitly described below. For example, the present embodiments can be variously modified and implemented without departing from the scope thereof. In the drawings to be used in the following description, the same reference numbers denote the same or similar parts, unless otherwise specified.

[1] First Embodiment

[1-1] Example of Functional Configuration:

FIG. 1 is a block diagram schematically illustrating an example of the functional configuration of a learning apparatus 1 as an example of the first embodiment. The learning apparatus 1 is an example of an information processing apparatus including an arithmetic processing device (not illustrated) that performs various calculation operations such as calculation operations related to deep learning. The learning apparatus 1 may learn parameters of a machine learning model such as a neural network, for example.

As illustrated in FIG. 1, the learning apparatus 1 may illustratively include a data storing unit 11, a learning unit 12, a parameter storing unit 13, a determiner 14, and an information storing unit 15.

The data storing unit 11 stores the data for learning used for training given machine learning models. As exemplarily illustrated in FIG. 2, the data for learning may be stored in a table format, or may be stored in various formats such as a Database (DB) and an array.

The data for learning may be a combination of input data and correct answer data (training data) corresponding to the input data. Each data can be identified by a data ID indicating identification information. For example, the data storing unit 11 may store an entry in which a data ID "00001", the input data "A1", and the correct answer data "B1" are associated with one another. A non-limiting example of the input data is image data including RGB elements.

Figure 3:
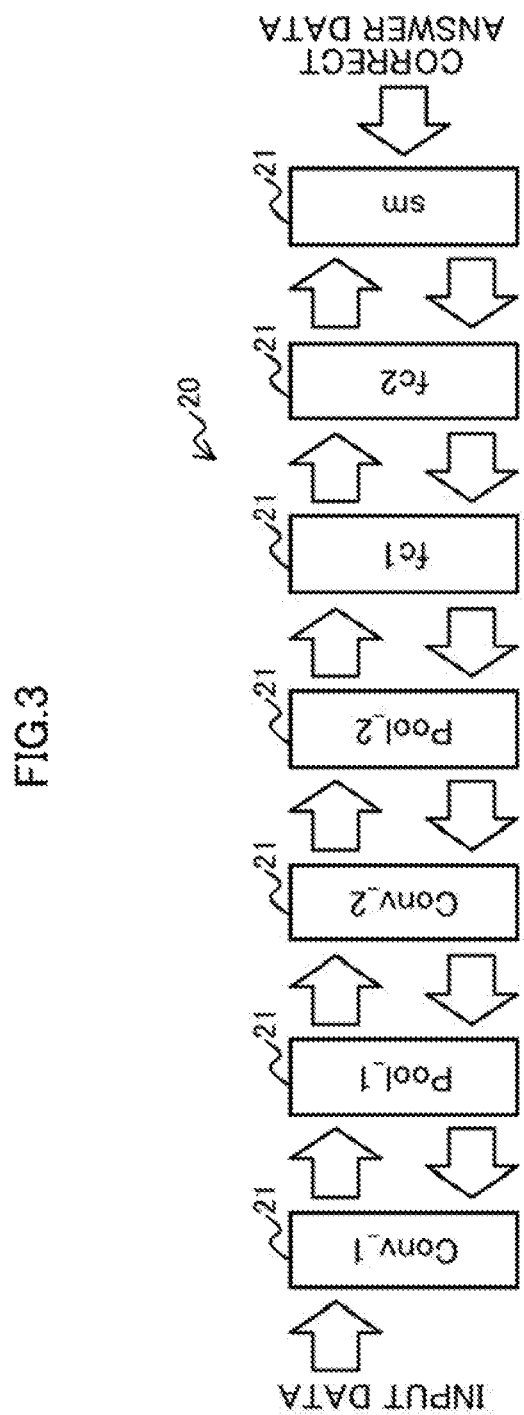
FIG. 3 is a diagram illustrating an example of deep learning on a Convolutional Neural Network (CNN)

The learning apparatus 1 uses the data for learning stored in the data storing unit 11 to train a Deep Neural Network (DNN), for example, a Convolutional Neural Network (CNN) 20, which is an example of a machine learning model. FIG. 3 is a diagram illustrating examples of deep learning on the CNN 20.

The CNN 20 exemplarily illustrated in FIG. 3 may include layers 21 of Conv_1, Pool_1, Conv_2, Pool_2, fc1, fc2, and sm. As illustrated in FIG. 3, in the deep learning process on the CNN 20, the correct answer data corresponding to the input data is given to the CNN 20. The learning apparatus 1 inputs the input data to the CNN 20 from the left end in the drawing of FIG. 3, and causes the processing results of the respective layers 21 to propagate in the rightward direction in the drawing (forward propagation). Then, the learning apparatus 1 compares the output data and the correct answer data related to the input data, and causes the result difference between the data to propagate in the leftward direction in the drawing (backward propagation).

For example, the convolution calculation on the Conv_1 layer is accomplished by executing a product-sum calculation of the parameters of the Conv_1 on the input data. Each of the layers 21 of Conv_1, Conv_2, fc1, and fc2 retains parameters. When the calculation is accomplished up to the top layer 21 (sm illustrated in FIG. 3) of the CNN 20, the calculation result is compared with the correct answer data, and the parameters of each layer 21 are updated on the basis of the comparison result.

Figure 4:
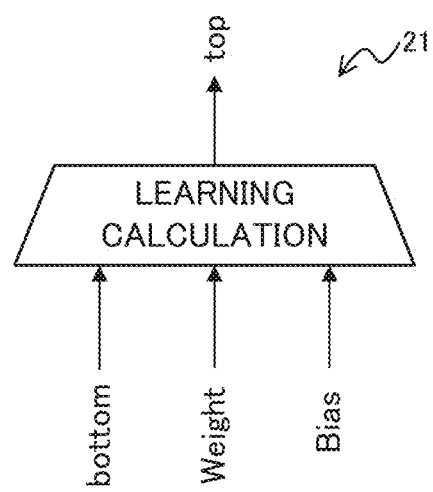
FIG. 4 is a diagram illustrating an example of learning calculation in each layer of a CNN.

In each layer 21 of the CNN 20, a calculation exemplarily illustrated in FIG. 4 is performed. As illustrated in FIG. 4, when the learning calculation is performed, a product-sum calculation on "bottom", which is the input data or the output data from a previous layer 21, and "Weight", which is a parameter, is performed. The output data "top" is output in accordance with the sum of the product-sum calculation result and "Bias".

The process of learning and inferring the CNN 20 may be performed by, for example, a Large Scale Integration (LSI) including a dynamic fixed-point processor.

Here, the learning apparatus 1 repeatedly trains the CNN 20 using the fixed-point number data. A fixed-point number may mean a numerical value expressed by fixing a decimal point position (digit), and the fixed-point number data may mean, for example, variables handled by each layer 21 in training of the CNN 20, or calculation results of each layer 21. The initial position (initial decimal point position) of the fixed-point number may be determined by the learning apparatus 1 on the basis of a learning result (trial result) obtained by training the CNN 20 one or more times using a numerical value of a floating-point number, or may be assigned by a user, for example.

For example, it is assumed that execution of a mini-batch of a learning process once is regarded as one iteration. A mini-batch means that multiple pieces of image data are simultaneously subjected to a learning process. For example, a mini-batch of "16" means that 16 pieces of image data are simultaneously subjected to the learning process. Therefore, for example, when 65536 pieces of image data is present, all the image data are input by 4096 iterations.

The learning unit 12 expresses the data for learning stored in the data storing unit 11 by a fixed-point number, trains the CNN 20 by using a numerical value of the fixed-point number, and obtains the parameter $W_L$ of each layer 21 of the CNN 20 as the learning result. Here, the symbol "L" represents an index for identifying each layer 23 of the CNN 20. The parameter is a parameter vector exemplified by the following expression (1). The subscript "Wn" represents the number of elements in the vector of the parameter $W_L$.

$$W_L = \{W_{0,L}, W_{1,L}, \ldots, W_{Wn,L}\} \quad (1)$$

As illustrated in FIG. 5, the parameter vector of the parameter storing unit 13 is updated each time the learning is repeated and then overwritten. For example data on the memory is rewritten in each iteration and when entire training is finished, weight data may be written into a file.

The determiner 14 determines the decimal point position of the fixed-point number on the basis of statistical information obtained by the learning process on the CNN 20. The decimal point, position determined by the determiner 34 is used by the learning unit 32 to train the CNN 20.

The information storing unit 15 is an example of a memory, and stores information obtained on the basis of the statistical information which information is to be used by the determiner 14 to determine a decimal point position. The information storing unit 15 and the determiner 14 will be detailed below.

Figure 6:
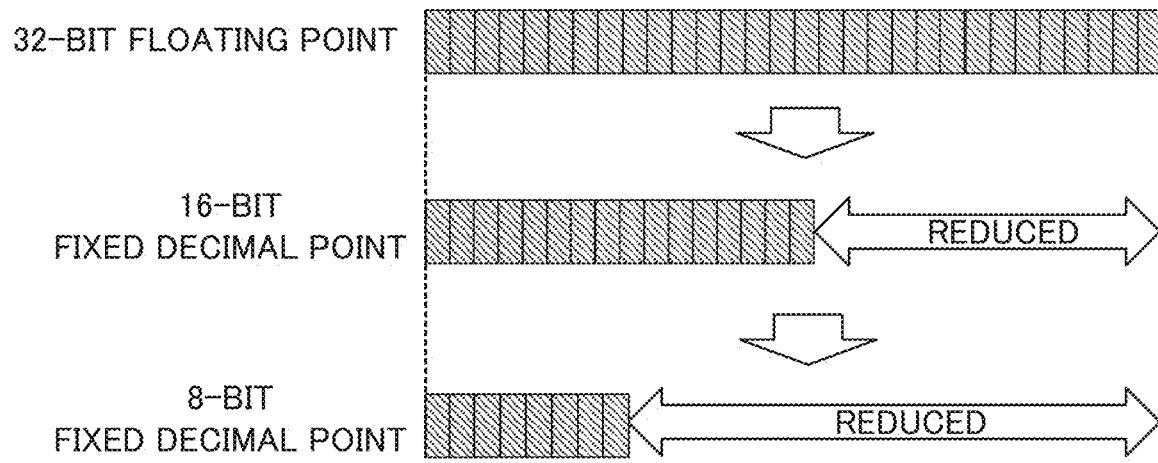
FIG. 6 is a diagram illustrating an example of expressing data of variables in each layer of a CNN.

[1-2] Decimal Point Position of Fixed-Point Number:

FIG. 6 is a diagram illustrating an example of expressing data of variables (parameters) in each layer 21 of the CNN 20. When a parameter is learned in deep learning, loads such as a computational load, a memory load, or the like are applied due to a huge computational amount, so that the learning time of the parameters is prolonged.

Here, in the first embodiment, in order to shorten the learning time of the parameters, as described above, the numerical value used in the training is expressed by a fixed-point number (e.g., 16-bit or 8-bit fixed-point number, or the like) instead of a floating-point number (e.g., 32-bit floating-point number).

By expressing a numerical value used in the training by a fixed-point number, as illustrated in FIG. 6, the amount of data can be reduced, and the load such as the computation load and the memory load can be reduced, so that the learning time of the parameters can be shortened.

However, fixed-point numbers have a narrower range of expressible numeral values than floating-point numbers. For this reason, the learning process by means of the numerical value expressed by the fixed-point number may have low accuracy of the learning result.

Figure 7:
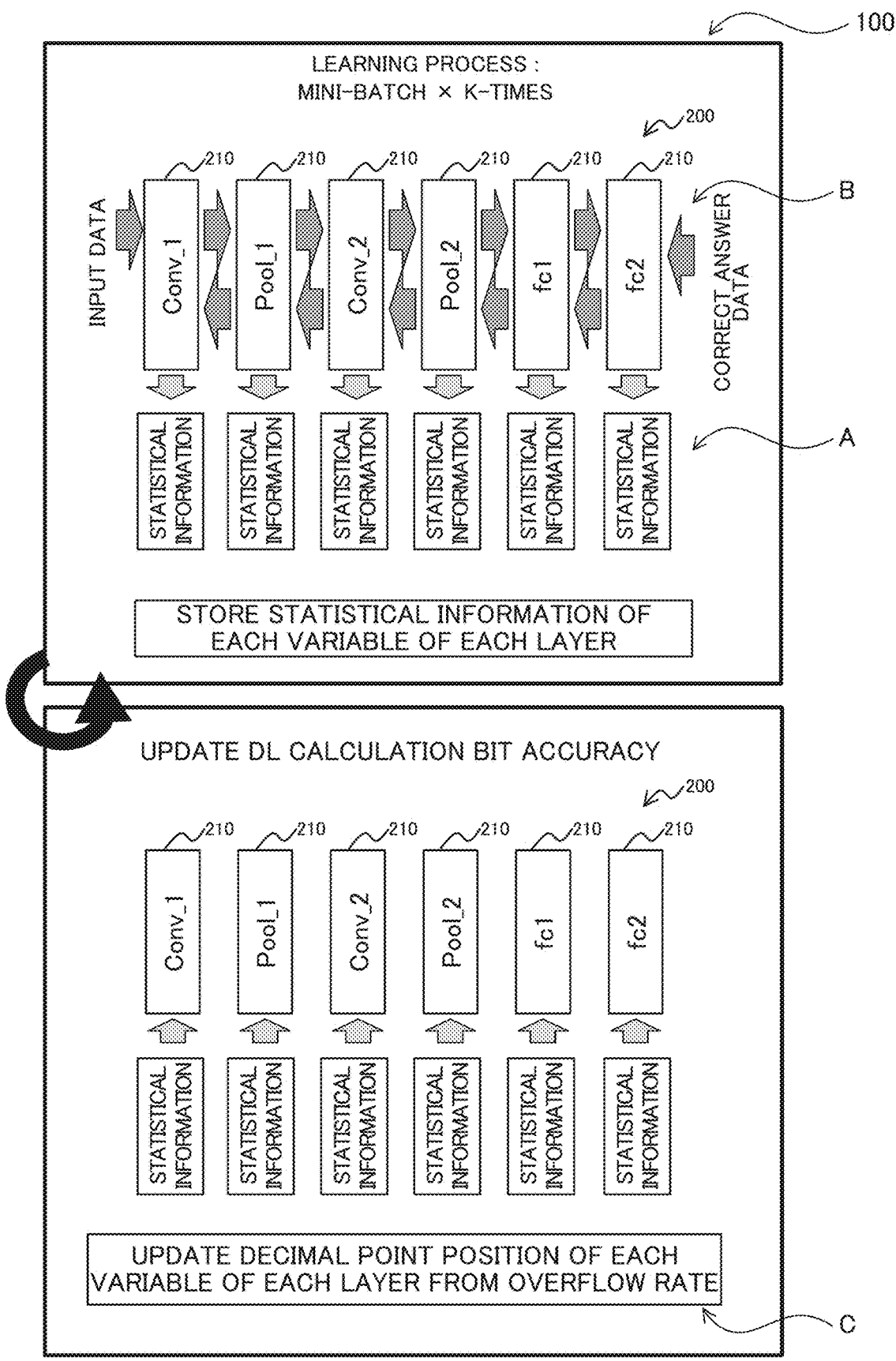
FIG. 7 is a diagram illustrating a process by a learning apparatus according to a comparative example.

As a solution to the above, statistical information is obtained during the learning in the deep learning and the decimal point positions of the variables used for the learning are adjusted. FIG. 7 is a diagram illustrating a process performed by a learning apparatus 100 according to a comparative example. As illustrated in FIG. 7, the learning apparatus 100 executes the following processes (A) to (C) until the learning is completed.

(A) The learning apparatus 100 stores the statistical information of each variable of each layer 210 during learning a mini-batch of a predetermined number of times (for example, K-times) (see symbol A in FIG. 7).

Here, the statistical information may include, for example, any of the following or a combination thereof. The application program that the learning apparatus 100 executes optimizes the decimal point position by obtaining statistical information from the processor. Along the process of: the application program, the processor executes an instruction for Dynamic Fixed Point (dynamic fixed-point number) calculation.

A distribution of a leftmost set bit position for positive number and a leftmost unset bit position for negative number A distribution of a rightmost set bit maximum value of the leftmost set bit position for positive number and the leftmost unset bit position for negative number The minimum value of the rightmost set bit position As described above, the statistical information can be information on a distribution of the leftmost set bit positions for positive number and the leftmost unset bit positions for negative number or a distribution of the rightmost set bit positions of the multiple pieces of fixed-point number data acquired for each time the learning the mini-batch is repeated.

Figure 8:
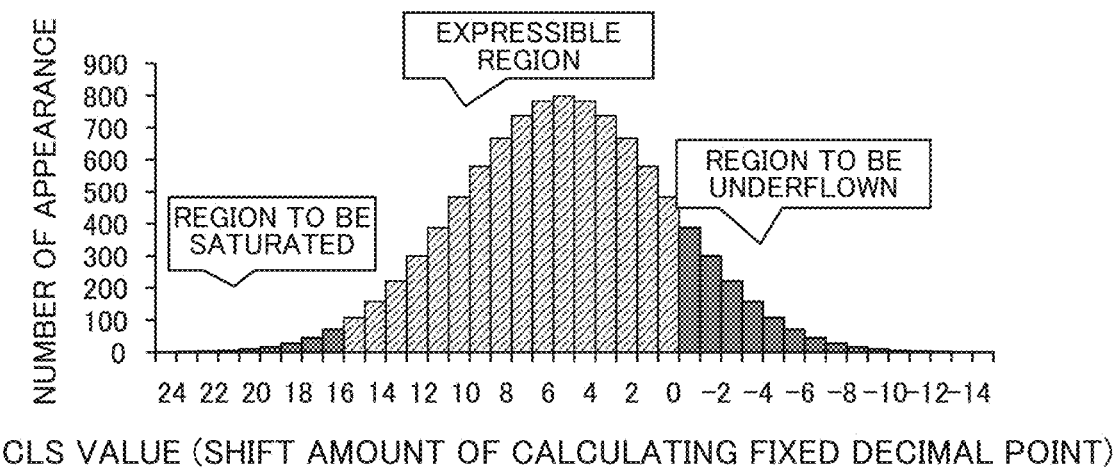
FIG. 8 is a diagram illustrating an example of a histogram representing a distribution of left most set bit position for positive number and left most unset bit position for negative number.

FIG. 8 is a diagram illustrating an example of a histogram representing the distribution of the leftmost set bit position for positive number and the leftmost unset bit position for negative number. In FIG. 8, the vertical axis represents the number of appearances of the leftmost set bit position for positive number and the leftmost unset bit position for negative number, and the horizontal axis represents the leftmost set bit position for positive number and the leftmost unset bit position for negative number. In the example of FIG. 8, a decimal point is assumed to be positioned on the right side of the drawing of bit 0. One example of the leftmost set bit position for positive number and the leftmost unset bit position for negative number is the value of a Count Leading Sign (CLS). The CLS may indicate the position of the leftmost set bit of a positive number (i.e., the position of the leftmost unset bit of a negative number).

The "expressible range" indicates a range (region) of the numeric value of the distribution of the leftmost set bit position for positive number and the leftmost unset bit position for negative number and which is included in a numerical value range of the 16-bit fixed-point number. The "region to be saturated" indicates a region of the numeric value of the distribution which exceeds the above numerical value range and in which a saturating process is performed. The saturating process is, for example, a process of clipping a positive maximum value when positive numbers overflow and a negative minimum value when negative numbers overflow. When a bit representing a minute resolution that the expressible range is unable to express appears, a rounding process is performed. The rounding process may be executed in a case except for the saturation, i.e., as well as a case where an underflowing occurs. For example, in cases where an underflowing occurs, a positive number may be probabilistically rounded to zero or a positive minimum value and a negative number may be probabilistically rounded to zero or a negative maximum value. In other cases, the number below the decimal point may be rounded.

(B) In cases where an overflowing occurs while training is performed in a mini-batch, the learning apparatus 100 executes a saturation process to continue the training (see symbol B in FIG. 7).

(C) After the K-time mini-batches are finished, the learning apparatus 100 adjusts the decimal point position of a fixed-point number on the basis of the statistical information on each variable of each layer 210.

For example, the learning apparatus 100 adjusts the decimal point position of a variable of a certain layer 210 on the basis of the statistical information of the same layer 210. The learning apparatus 100 performs such adjustment for each layer 210 and for each variable.

Figure 9:
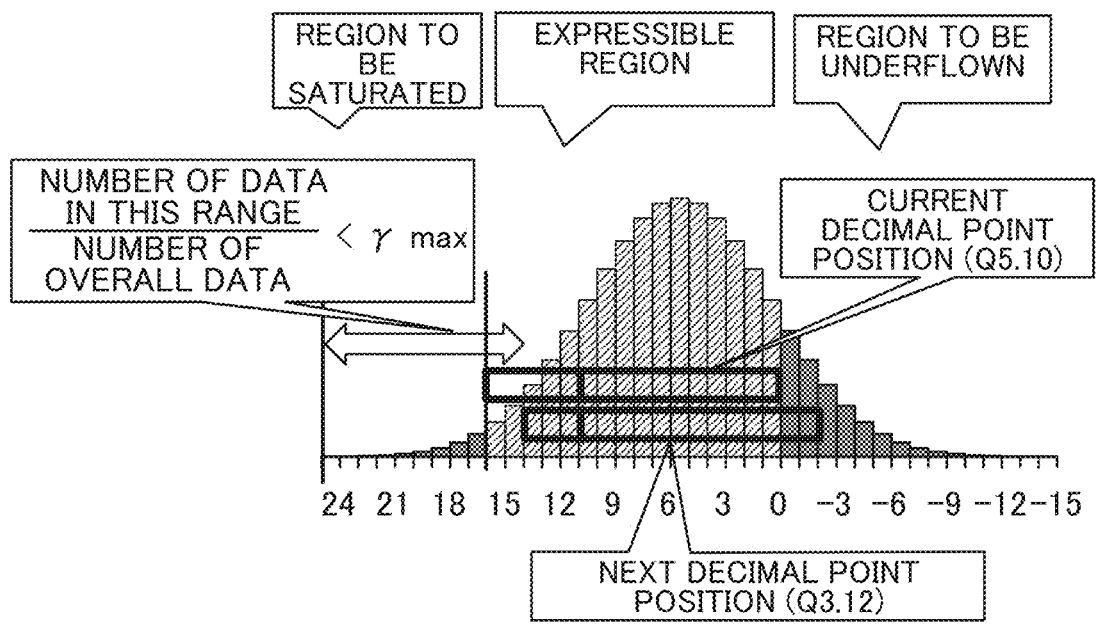
FIG. 9 is a diagram illustrating an example of an updating process on a decimal point position.
Figure 10:
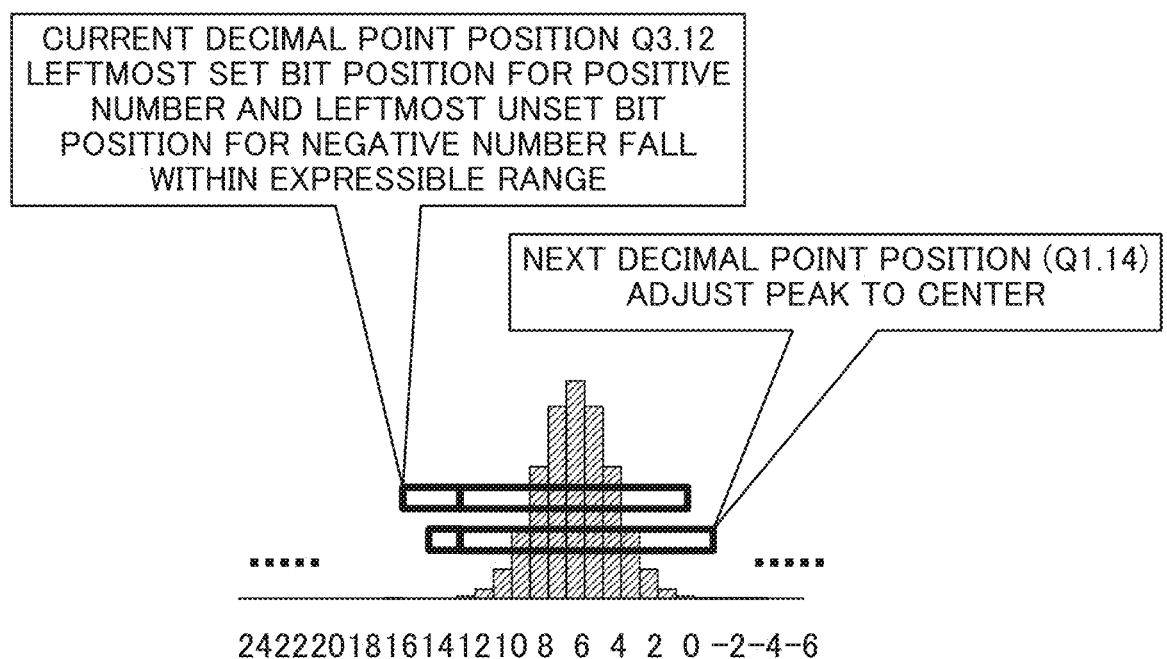
FIG. 10 is a diagram illustrating an example of an updating process on a decimal point position.

FIGS. 9 and 10 are diagrams illustrating an example of an updating process of a decimal point position; FIG. 9 illustrates a case where the distribution of the leftmost set bit position for positive number and the leftmost unset bit position for negative number appearing in the statistical information does not fall within the expressible range of the learning apparatus 100, and FIG. 10 illustrates a case where the distribution of the leftmost set bit position for positive number and the leftmost unset bit position for negative number appearing in the statistical information is in the expressible range.

As illustrated in FIG. 9, assuming that the present decimal point position (bit accuracy) is (Q5. 10), the learning apparatus 100 determines, as the next bit accuracy, the largest "numerical value range" in which the ratio of the number of data of a certain "numerical value range" to the total number of data is less than the overflow rate γmax. In the example of FIG. 9, the learning apparatus 100 determines the next decimal point position to be (Q3. 12). The overflow rate γmax may be specified by the user, for example. Decimal point position may be a Q format that defines bit data and, for example, (Q5. 10) defines 16-bit data with one sign bit, five integer bits, and ten decimal bits.

As illustrated in FIG. 10, assuming that the current decimal point position is (Q3. 12), the learning apparatus 100 adjusts, for example, the peak of the histogram to be located at the center of the next decimal point position In the example of FIG. 10, the learning apparatus 100 adjusts the next decimal point position to (Q1. 14). Alternatively, the learning apparatus 100 may adjust the decimal point position such that the accuracy matches the average of the number of appearances on the histogram.

Here, in the DNN including the CNN 200, the parameters and the distributions of the operation result outputs of each layer 210 change in accordance with the progress of the training. In the training using the dynamic fixed point, the learning apparatus 100 according to the above-described comparative example determines the decimal point position to be used in the next K-time mini-batch processes from the statistical information obtained in the K-time mini-batch processes.

However, the data of each mini-batch (data for one iteration) is not uniform, and the distribution of the values of the error to be fed back varies due to the input data of the mini-batch and the backward propagation, so that the distribution of the intermediate values fluctuates. In cases where the fluctuation of the distribution is large, an error occurs between the decimal point position for calculation and the ideal decimal point position from the distribution of actual parameters or output to increase the quantization error due to a saturation process or a rounding process of the fixed decimal point, so that the learning becomes unstable, in other words, a recognition accuracy may decrease.

Figure 11:
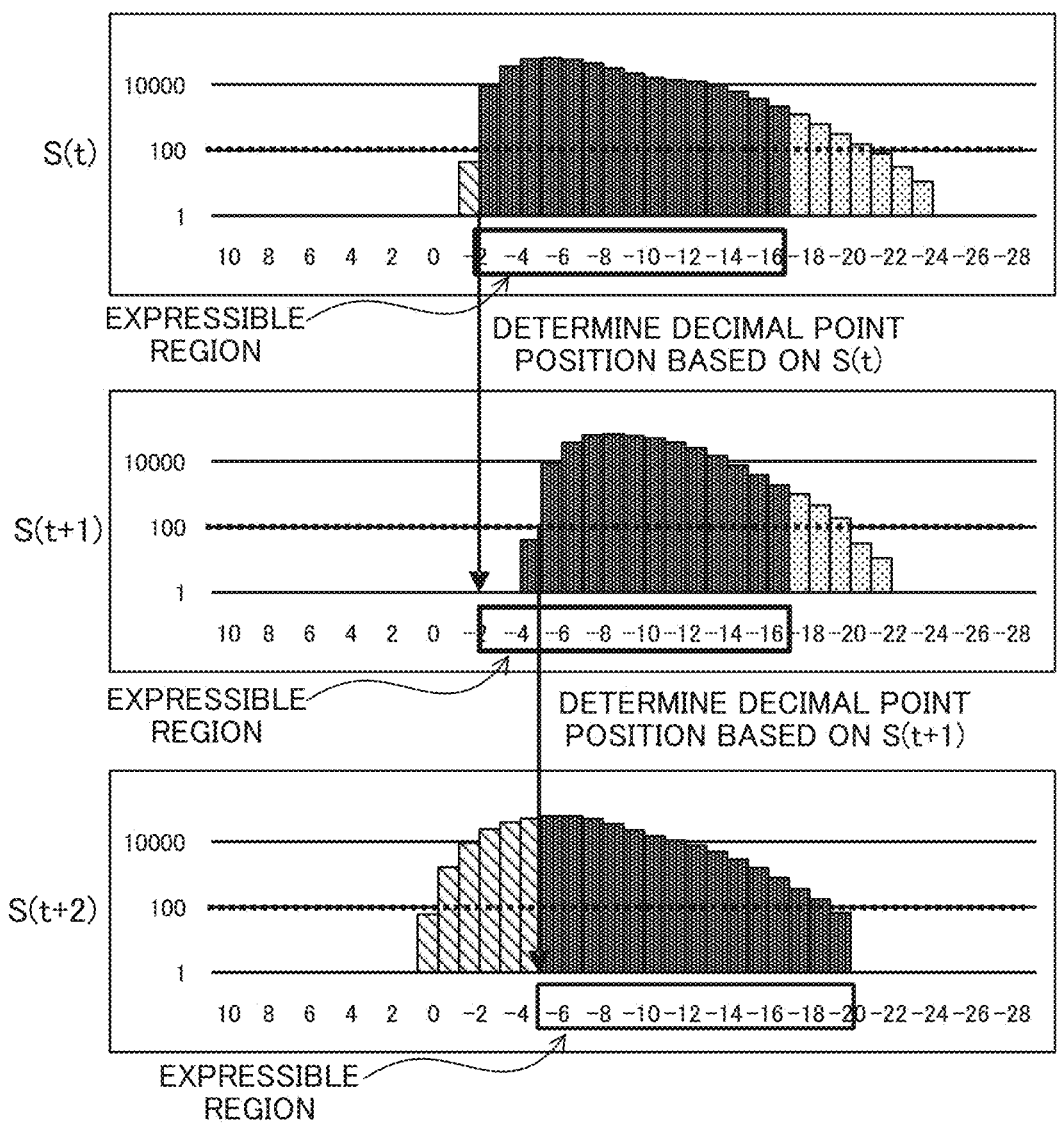
FIG. 11 is a diagram illustrating examples of distribution information S(t) to S(t+2) of Count Leading Sign (CLS) in the t- to (t+2)-th mini batches.

FIG. 11 is a diagram illustrating examples of distribution information S(t) to S(t+2) of CLS in the t- to (t+2)-th mini batches, assuming K=1. Since the data of batches are not uniform, the distribution of values varies as illustrated in FIG. 11 due to variations in the input data and the correct answer data. In the example of FIG. 11, a region indicated by a hatched line is a saturation region, a region indicated by a light hatching is a rounded region, and a region indicated by a dark hatching is an expressible range.

As illustrated in FIG. 11, when the distribution of the CLS fluctuates greatly, determination of the decimal point position on the basis of S(t+1) increases the number of appearances included in the saturation region in S(t+2). Thus, when the decimal point position is determined based on the distribution of previous one iteration (liter), the quantization error may become large due to the fluctuation of the distribution.

Therefore, the learning apparatus 1 according to the first embodiment suppresses the deterioration of the accuracy of the learning result of the machine learning model by adjusting, for example, correcting, the decimal point position determined by K-times statistical information using the statistical information of the previous layer(s).

Figure 12:
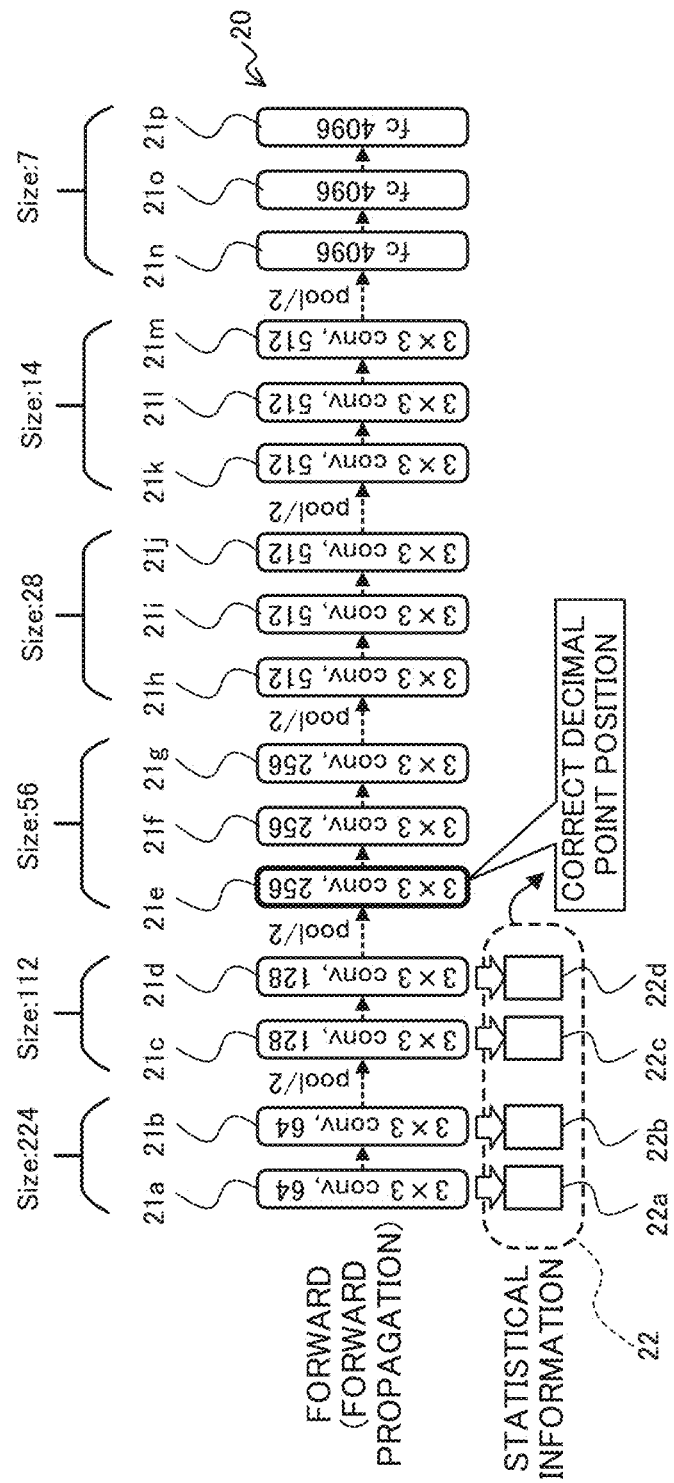
FIG. 12 is a diagram illustrating statistical information used in an example of a correction process of a decimal point position in the forward propagation.
Figure 13:
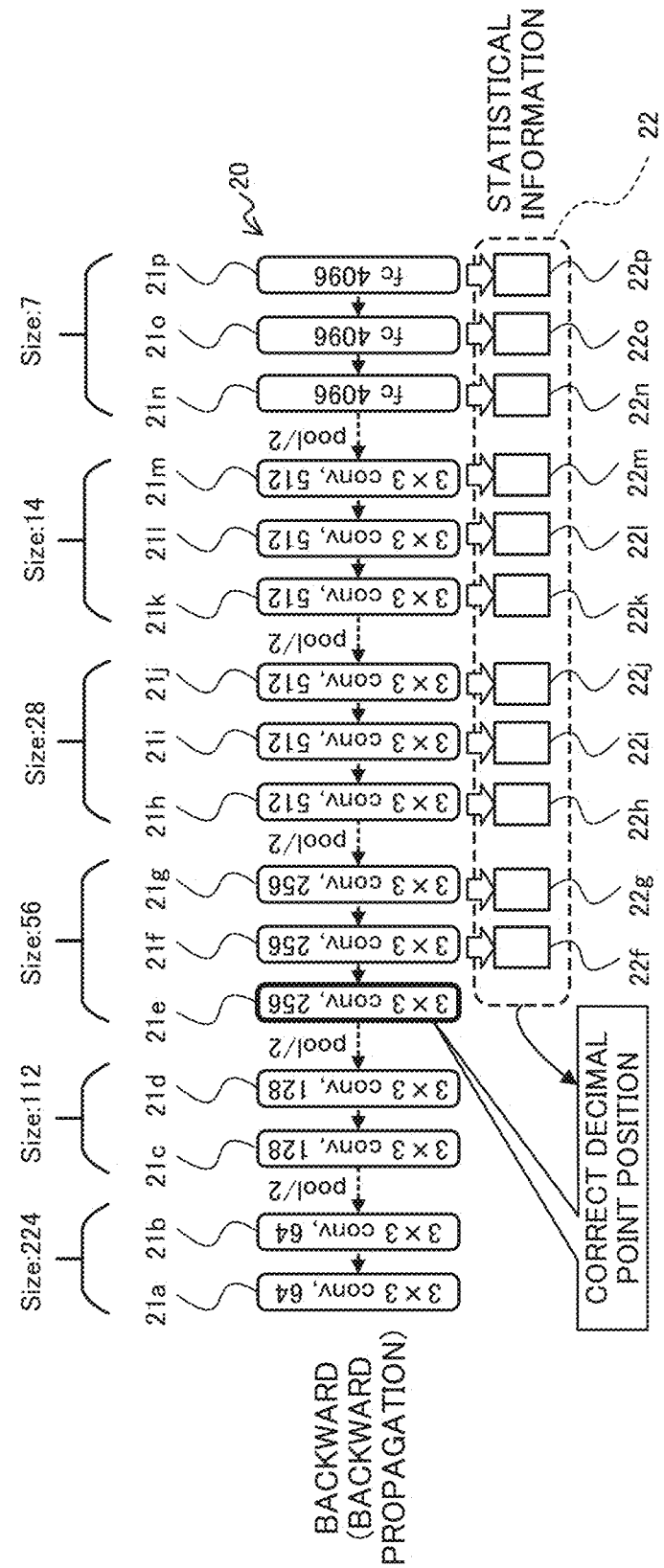
FIG. 13 is a diagram illustrating statistical information used in an example of a correction process of a decimal point position in the backward propagation.

FIGS. 12 and 13 are diagrams illustrating statistical information 22 used in an example of a correction process of the decimal point position.

As illustrated in FIGS. 12 and 13, the previous layer 21 may mean one or more layers 21 ahead of the correction target layer 21 of correcting its decimal point position with respect to the propagation direction of the data, in other words, one or more layers 21 on the input side of the correction target layer 21.

For example, in cases of the forward propagation illustrated in FIG. 12, the layer 21 previous to the correction target layer 21e for correcting its decimal point position becomes at least one layer 21 of the layers 21a to 21d previous to the layer 21e. In the example of FIG. 12, the learning apparatus 1 may correct the decimal point position of the layer 21e by using the statistical information 22a to 22d of the layers 21a to 21d, respectively.

On the other hand, for example, in cases of backward propagation illustrated in FIG. 13, the layer 21 previous to the correction target layer 21e for correcting the decimal point position becomes at least one layer 21 of the layers 21f to 21p behind the layer 21e. In the example of FIG. 13, the learning apparatus 1 may correct the decimal point position of the layer 21e by using the statistical information 22f to 22p of the layers 21f to 21p, respectively.

Figure 14:
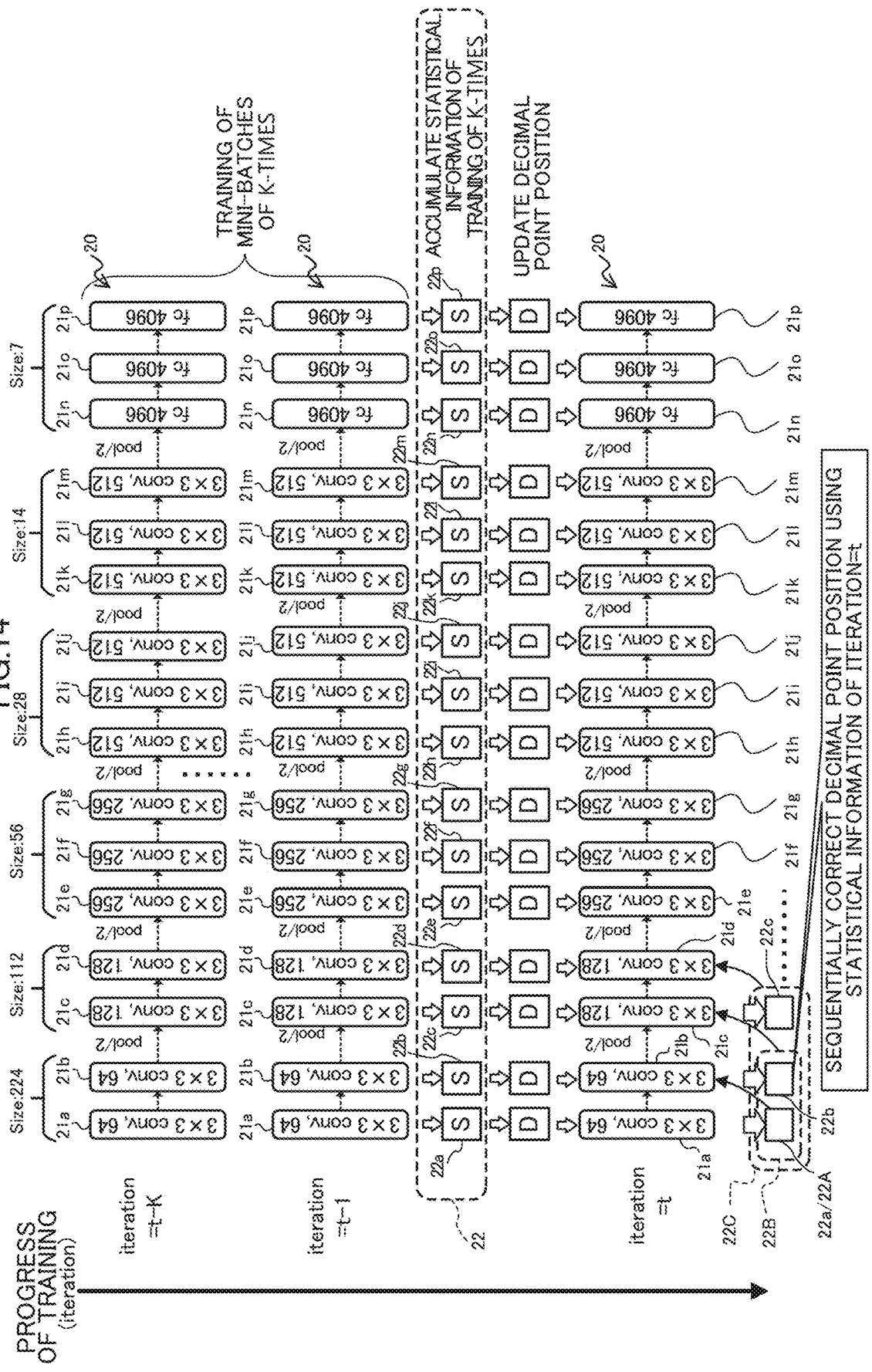
FIG. 14 is a diagram for explaining an example of a progress of training and a determination process of a decimal point position.

FIG. 14 is a diagram for explaining an example of the progress of learning and a determination process of the decimal point position. The learning apparatus 1 trains the CNN 20 by a predetermined number of times of mini-batches, for example, K-times mini-bathes, in the same manner as in the comparative example. In FIG. 14, "S" in the boxes 22a to 22p represent statistical information and "D" in the boxes below the statistical information 22 represents a decimal point position.

During training of the CNN 20, the learning apparatus 1 sequentially obtains and accumulates statistical information 22a to 22p obtained by training the layers 21a to 21p in the respective iterations. These statistical information 22 may be stored in, for example, a register or a memory provided in or connected to hardware, such as an LSI, that performs training and inferring of the CNN 20.

The learning apparatus 1 updates the decimal point position of each layer 21 on the basis of the statistical information 22 of training (iterations t−K to t−1) for K-times mini-batches. For example, the learning apparatus 1 determines a fixed-point number to be the basis of the layers 21a to 21g of the iteration t on the basis of the statistical information 22a to 22g, respectively. The determined fixed-point number may be used as the basis for learning the next K-times (iterations t to t+K−1) mini-batches containing iteration t.

In addition, in training of each layer 21 in iteration t, the learning apparatus 1 sequentially corrects the decimal point position by using statistical information of the layer 21 previous to the current layer 21.

For example, the learning apparatus 1 corrects the decimal point position of the layer 21b on the basis of the statistical information 22a (22A) of the layer 21a in the iteration t before executing the forward propagation calculation of the layer 21b and storing the statistical information 22b. Similarly, the learning apparatus 1 corrects the decimal point position of the layer 22c based on the statistical information 22a and 22b (statistical information 22B) of the layers 21a and 21b, and corrects the decimal point position of the layer 22d based on the statistical information 22a to 22c (statistical information 22C) of the layers 21a to 21c. The same applies to layers 22e and the subsequent layers. In cases of the backward propagation calculation, the learning apparatus 1 may correct the decimal point position of the layer 21 on the basis of the backward statistical information, i.e., the statistical information 22 of from the layers 21p to 21b.

[1-3] Example of Correction Process on Decimal Point Position:

The distributions of the outputs of the layers 21 in CNN 20 are influenced by the combinations of images of the mini-batches. The weight parameter in each layer 21 is gradually changed by, for example, the gradient method. Therefore, in the first embodiment, a correction process for predicting the fluctuation of the distribution for each batch from the feature of the mini batch and correcting the decimal point position is performed in a method exemplified below.

For example, during the training of the mini-batch by the learning unit 12, the determiner 14 obtains the statistical information 22 related to each variable of each layer 21 of the CNN 20, and stores the information obtained from the obtained statistical information 22 in the information storing unit 15.

As illustrated in FIG. 25, the information storing unit 15 stores a "iteration number" i representing the number of repeating of the learning process, and a "feature value" and a "difference value" obtained from the statistical information 22 for each layer 21 of the CNN 20 in association with each other.

The "difference value" is an example of an error in the decimal point position of the fixed-point number data obtained on the basis of the statistical information 22, and is, for example, a value of a difference (for example, a difference in the number of bits of the integer part) between the current decimal point position and an ideal decimal point position. The current decimal point position is the decimal point position determined from the statistical information 22 of the same layer 21 in the previous iteration. The ideal decimal point position is the decimal point position obtained from the statistical information 22 in the current iteration.

For example, the determiner 14 calculates, as the "difference value" of the layer 1 of the iteration t, "0" which is a difference between the current decimal point position determined from the statistical information 22 of the previous iteration t−1 and the ideal decimal point position obtained from the statistical information 22 of the current iteration t, as illustrated in FIG. 15.

The "feature value" is information on the feature of the decimal point position obtained from the statistical information 22, and may include at least one element of the saturation digit number, the centroid of a histogram, the histogram itself, and the like.

Figure 16:
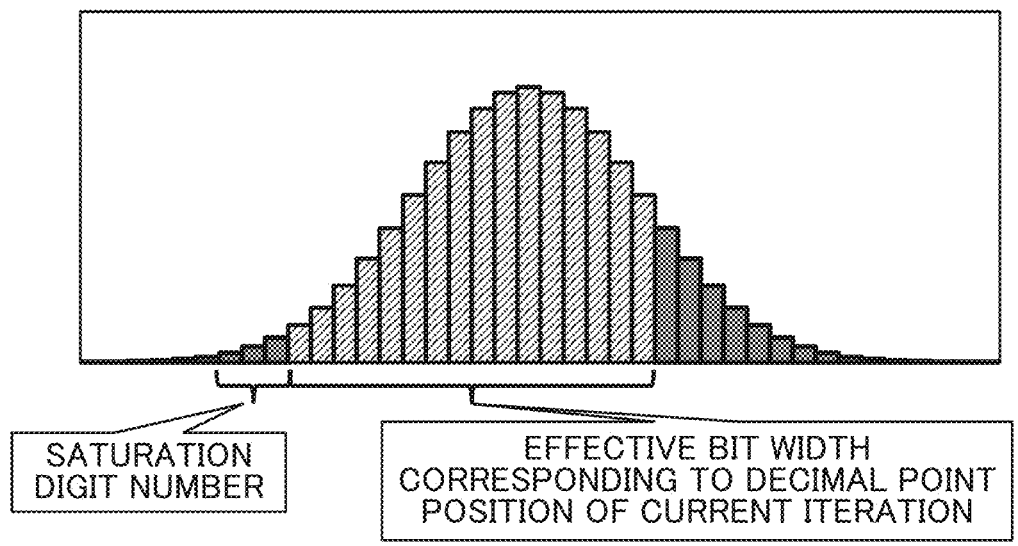
FIG. 16 is a diagram for explaining a saturation digit number.

As illustrated in FIG. 16, the "saturation digit number" is the difference between the significant digits chat makes the statistical information 22 greater than "0" and the valid range of the numeric value that is the fixed-point number. In FIG. 15, the saturation digit number is exemplified as the feature value.

Figure 17:
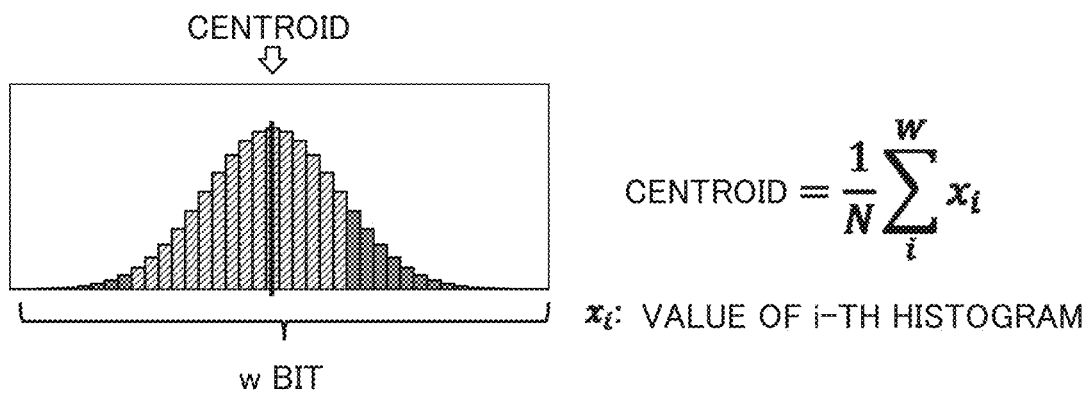
FIG. 17 is a diagram for explaining an example of calculation of the centroid of a histogram.

As illustrated in FIG. 17, the "centroid of a histogram" may be calculated by the following Expression (2) on the basis of the histogram represented by the statistical information 22.

$$\text{Centroid}=1/N\Sigma_i^W x_i \qquad \text{Expression 1}$$

The "histogram" may be the statistical information 22 itself, a part of the statistical information 22, or information obtained by processing the statistical information 22.

During the training, the determiner 14 may obtain (calculate) the difference value and the feature value for each layer 21, and store the obtained information into the information storing unit 15 as storage information.

Before starting the training of a certain layer 21, the determiner 14 corrects the decimal point position of the variables to be used in the training of the certain layer 21 on the basis of the stored information about the layer 21 previous to the certain layer 21 set in the information storing unit 15.

Figure 18:
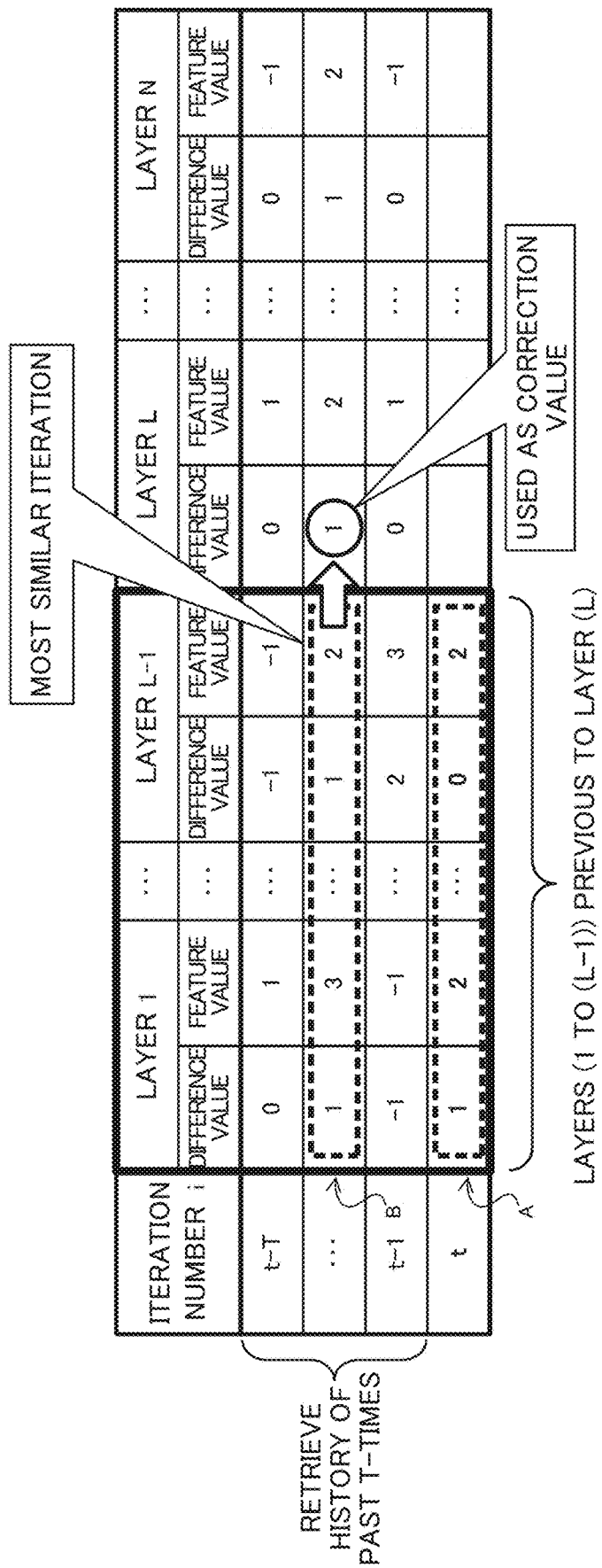
FIG. 18 is a diagram illustrating an example of a correction process of the decimal point position.

FIG. 18 is a diagram illustrating an example of a correction process on a decimal point position. For example, the determiner 14 retrieves an entry similar to the current iteration from the storage information of the past T (T is an integer of 1 or more) times relating to a layer 21 previous to the layer (layer L) 21 that starts training.

For example, description will now be made in relation to a case where the determiner 14 determines a correction value for correcting the decimal point position of the layer L (first layer). The determiner 14 identifies the x-th (x is an integer less than t) iteration previous to the t-th iteration having a similar tendency of the error in the t-th (t is an integer of 2 or more) iteration of training the layers 1 to L−1 (second layers) prior to layer L. The second layers with respect to the first layer (e.g., layer L) may be regarded as, for example, one or more layers 21 or a combination of two or more layers 21 among the layers 21 from the leading layer 21 to the layer 21 previous one to the first layer in the neural network. The following description assumes that layers 1 to L−1 are used as the second layers.

In the example of FIG. 18, when training of the layer L in the iteration t is started, the determiner 14 retrieves an entry similar to the storage information of layers 1 to L−1 of the iteration t from the storage information of layers 1 to L−1 of the iteration t−T to t−1. For example, the determiner 14 detects an entry (see symbol B) of the iteration most similar to the entry (see symbol A) of the current iteration t from the information storing unit 15.

In the determination of similarity, the determiner 14 may determine that the similarity between entries (between iterations) is higher as the result of calculating, for example, the sum or the average of at least one of the difference between the difference values and the difference between the feature values for all the layers 21 of the layers 1 to L−1 is smaller, for example. The determination of the similarity is not limited to the above-described method, and various methods may be used.

Then, the determiner 14 determines the correction value for the layer L in the t-th iteration on the basis of the error of the layer L in the identified x-th iteration.

For example, the determiner 14 uses the "difference value" set in the layer L of the iteration determined (detected) to be similar as the correction value (prediction value) to be set in the layer L in the iteration t.

The correction value is an example of an "offset amount" for correcting the decimal point, position, for example, an offset value. In other words, the determiner 14 determines an offset amount for correcting the decimal point position of the fixed-point number data to be used for training on the basis of the tendency of the error in each iteration.

In the example of FIG. 18, the determiner 14 uses "1", which is the difference value of the layer L in the entry indicated by the symbol B, as the correction value for the layer L in the current iteration t indicated by the symbol A. For example, the determiner 14 may add, in the layer L of the iteration t, one bit to the integer bit of a fixed-point number (see FIG. 14) of the layer L that is updated on the basis of the statistics 22 of the iteration t–K to t–1 in accordance with the "difference value".

In the example illustrated in FIG. 18, the determiner 14 determiners a similarity between entries based on both the "difference value" and the "feature value" in the storage information stored in the information storing unit 15, but the determination of the similarity is not limited to this. Alternatively, the determiner 14 determiners such a similarity between entries based on one of the "difference value" and the "feature value".

In the example illustrated in FIG. 18, the determiner 14 is assumed to obtain the correction value for the correction target layer 21 based on the history (statistics) of all the layers 21 previous to the correction target layer 21, but the obtaining of the correction value is not limited to this.

Alternatively, the determiner 14 may calculate the correction value of the correction target layer 21 based on, for example, the history of part of the layers 21 (in other words, the second layers) previous to the correction target layer 21 (in other words, the first layer). Alternatively, the determiner 14 may use a history of only the layer 1, only the leading layer 23 in or a combination of layers 21 in the block to which the correction target layer 21 belongs among the layers 21 previous to the correction target layer 21.

Figure 19:
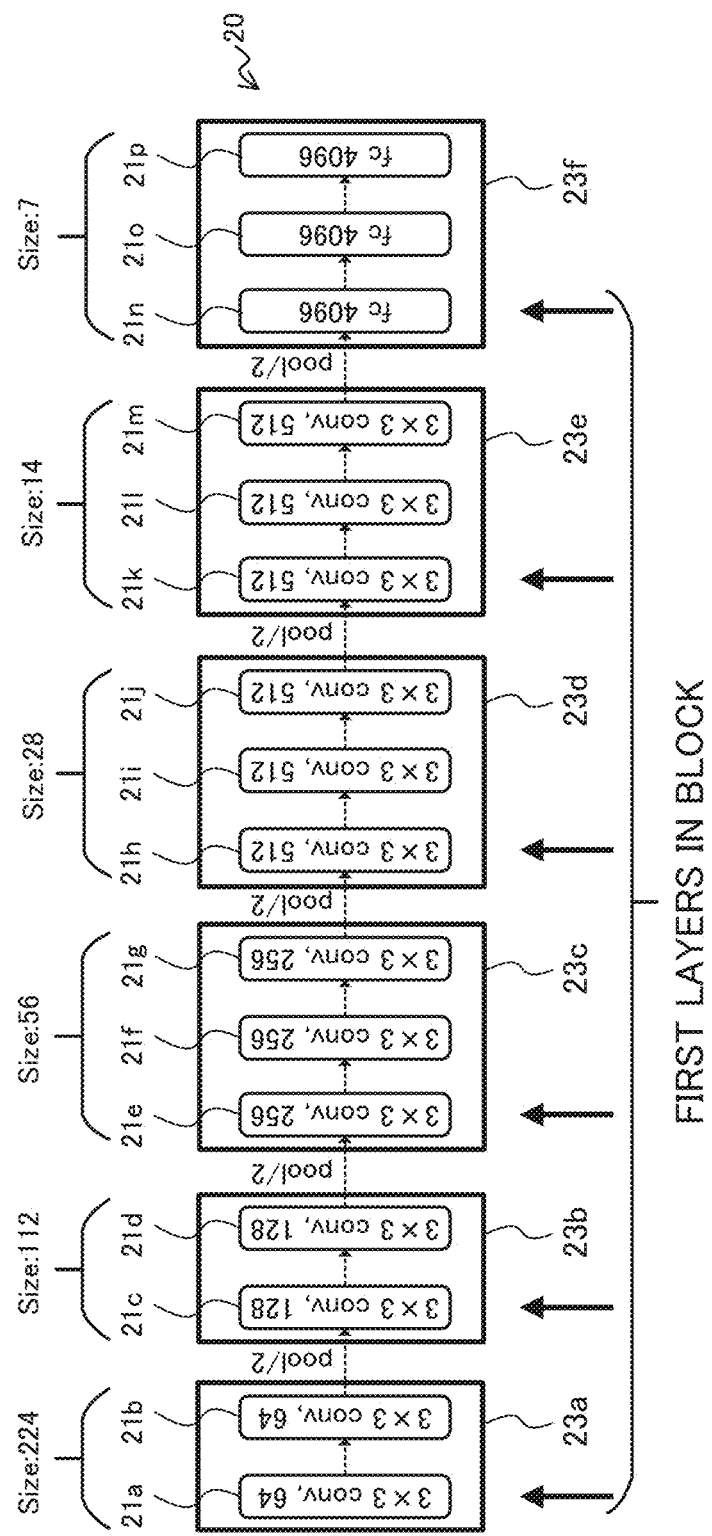
FIG. 19 is a diagram illustrating a case where the determiner uses the history of the leading layer of a block.

FIG. 19 is a diagram illustrating a case where the determiner 14 uses the history of the first layer 21 of the block. As illustrated in FIG. 19, the layers 21 of the CNN 20 may be grouped (classified) into blocks 23 (blocks 23a to 23f in the example of FIG. 19) in units of two or more successive layers 21 in accordance with a process or the like for inputting data. Layers 21 grouped in the same blocks 23 sometimes have a stronger correlation of tendency in the fluctuation of the fixed-point position of the parameters than the correlation between layers 21 in different blocks 23.

Therefore, in obtaining the correction value of the layer 21g at the iteration t, for example, the determiner 14 may determine the leading layer 21e of the block 23c to which the layer 21g belongs to be the target layer for determination of similarity.

In this case, the determiner 14 retrieves an entry similar to the storage information of the layer 21e at the iteration t from the iterations t–T to t–1 of the layer 21e, and determines the "difference value" of the layer 21g in the most similar entry to be the correction value of the layer 21g. For example, in obtaining the correction value of the layer 21g at the iteration t, the determiner 14 may determine multiple layers 21 (for example, the leading layer 21e and the layer 21f) previous to the layer 21g in the block 23c to which the layer 21g belongs to be the target layers for determination of similarity. In other words, the second layers with respect to the first layer (e.g., layer 21g) may be, for example, one or more layers 21 in or a combination of two or more layers 21 of layers 21 from the leading layer 21e to the layer 21f previous one to the layer 21g in the block 23c to which the layer 21g belongs.

Alternatively, the determiner 14 may determine at least one of the leading layers 21a and 21c of the blocks 23a and 21b previous to the layer 21g in addition to the leading layer 21e in the block 23c to which the layer 21g belongs to be target layers for determination of similarity.

Like the above manners, limiting (narrowing) the target layers 21 for determination of similarity can reduce the processing load of the similarity determination and can shorten the processing time (enhance the speed of the processing).

Although the case of forward propagation has been described above, the backward propagation may determine the correction value for the decimal point position from the rear side (from the layer 21p in the example of FIG. 13) toward the front side (toward the layer 21a in the example of FIG. 13). At this time, the decimal point position of the layer 21 on the front side may be corrected by using the feature amount of the layer 21 on the rear side. As described above, the backward propagation is different, from the forward propagation in the point that the correction value of the decimal point position is obtained in the order from the layer 21 on the rear side to the layer 21 on the front side and that the statistical information 22 of the layer 21 on the rear side is used in place of the statistical information 22 of the layer 21 on the front side, but is the same may be the same as in the case of the forward propagation. As an example, in the case of backward propagation, in cases where the target layer 23 for correction is the layer 21e, the decimal point position of the layer 21e may be corrected using at least one of the statistical information 22f to 22p of the layers 21f to 21p rear side of the layer 23e.

Figure 20:
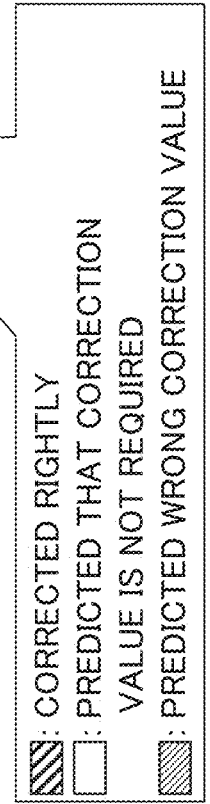
FIG. 20 is a diagram illustrating an example of a simulation result of a relationship between a correction value (predicted value) in forward propagation and an actual difference value.
Figure 21:
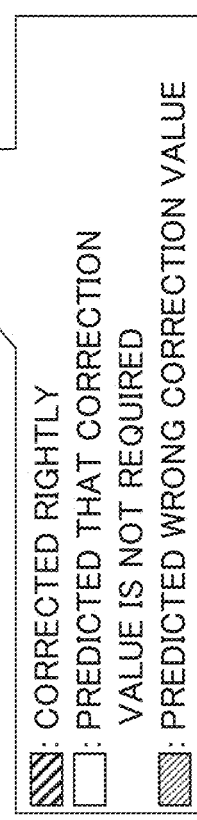
FIG. 21 is a diagram illustrating an example of a simulation result of the relationship between a correction value (predicted value) in the backward propagation and an actual difference value.

FIGS. 20 and 21 are diagrams illustrating examples of simulation results of the relationship between the correction value (prediction value) determined in the above-described manner and the actual difference value in the forward propagation and the backward propagation, respectively.

According to the method of the first embodiment, the decimal point position were appropriately corrected in many cases of the conv5_4 (see FIG. 20) in the forward propagation and the conv2_2 (see FIG. 21) in the backward propagation.

As described above, according to the learning apparatus 1 of the first embodiment, the information storing unit 15 stores the error of the decimal point position of the fixed-point number data obtained based on the statistical information 22. Then, the determiner 14 determines an offset amount for correcting the decimal point position of the fixed-point number data to be used for training on the basis of the tendency of the error in each iteration.

Thereby, even when the input data of the mini-batches or the distribution of the value of the error to be fed back fluctuates, for example, it is possible to correct the decimal point position of the fixed point data appropriately and to thereby suppress the deterioration of the accuracy of the training result of the machine learning model.

Therefore, a neural network to which a dynamic fixed-point number can be applied can be increased.

In addition, since the deep learning can be performed with high accuracy by means of a fixed-point number, the data transfer amount and the circuit scale of the calculator can be reduced, and thereby consumption power can be reduced. For example, if the 32-bit floating-point number is reduced to a 16-bit fixed-point number, memory usage and the data transfer amount can be reduced by half. In addition, the circuit scale of the product-sum calculation in the LSI can be reduced to about half.

Figure 22:
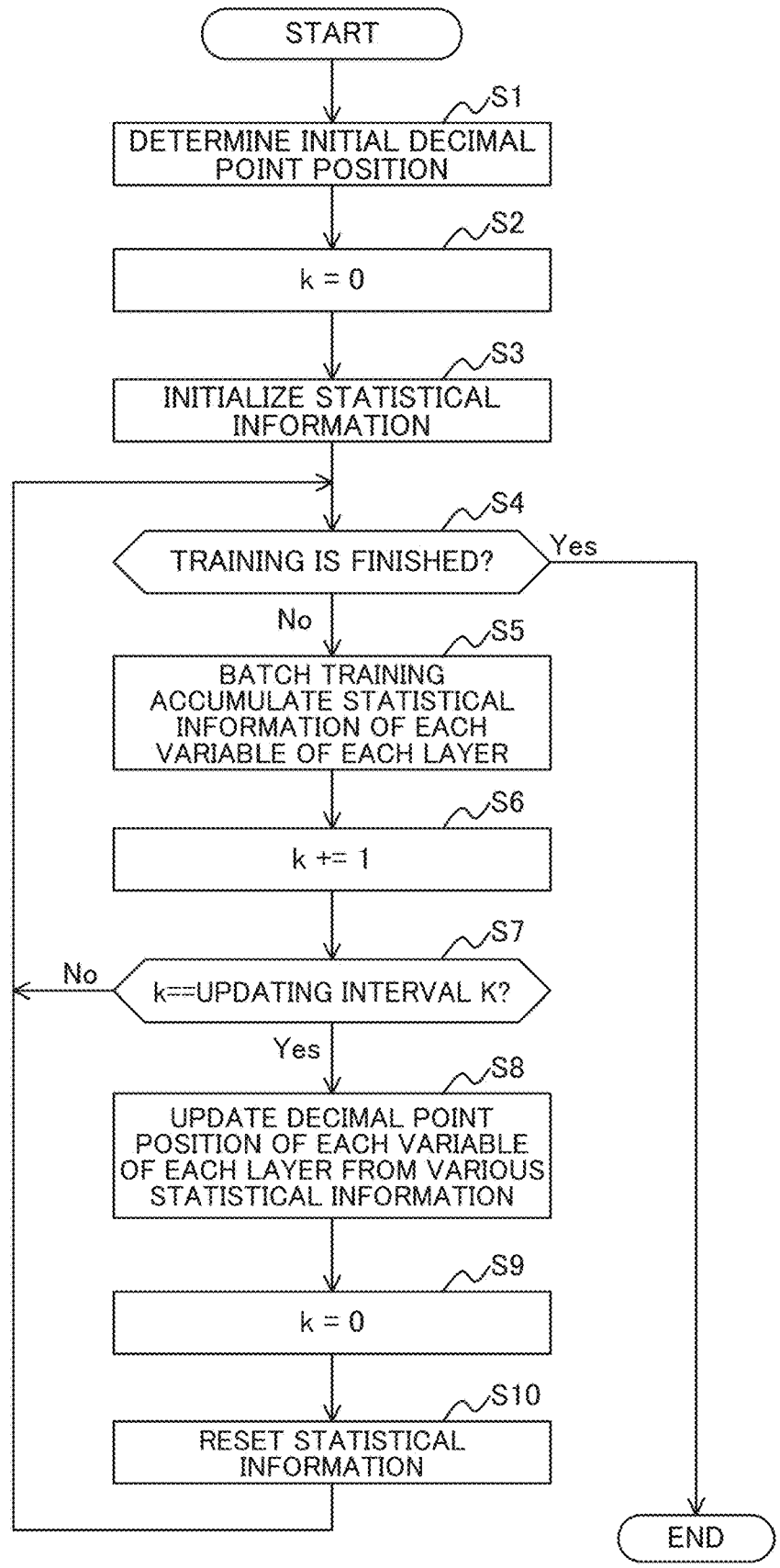
FIG. 22 is a flowchart illustrating an example of the operation of the learning apparatus according to the first embodiment.
Figure 23:
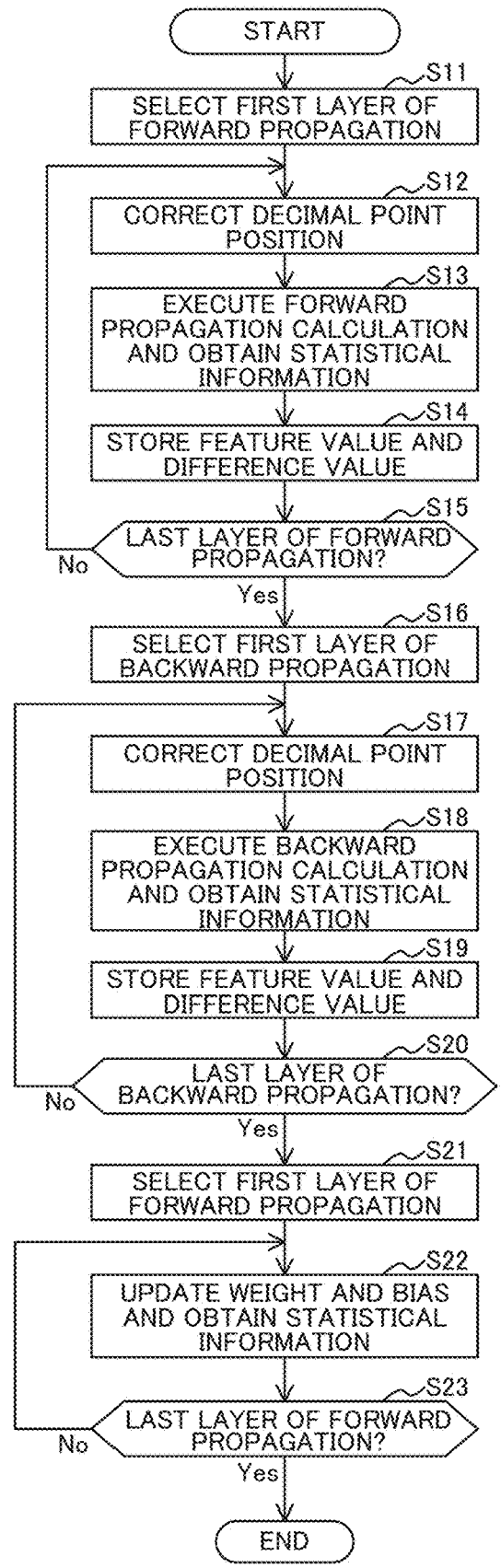
FIG. 23 is a flowchart illustrating an example of the operation of a batch learning process illustrated in FIG. 22.

[1-4] Example of Operation:

Next, an example of an operation of the learning apparatus 1 according to the first embodiment will now be described with reference to FIGS. 22 and 23. FIG. 22 is a flowchart illustrating an example of the operation of the learning apparatus 1 according to the first embodiment, and FIG. 23 is a flowchart for explaining an example of the operation of the batch learning process illustrated in FIG. 22.

As illustrated in FIG. 22, the learning apparatus 1 determines an initial decimal point position (Step S1), sets the number of times k=0 (Step S2), and initializes the statistical information 22 (Step S3).

The learning unit 12 of the learning apparatus 1 determines whether the learning of the CNN 20 has been completed (Step S4). If the learning is determined to be completed (Yes in Step S4), the process ends. On the other hand, if the learning is determined not to be completed (No in Step S4), the process proceeds to Step S5. As the criterion for judging the end of learning, for example, any one or a combination of two or more of various criteria such as that the error of the learning result falls below the threshold value, that the accuracy of the learning result exceeds the threshold value, and that the number of times of learning exceeds the threshold value may be used.

In Step S5, the learning unit 12 learns batches for the CNN 20, and accumulates the statistical information 22 of the respective layers 21.

In addition, the learning unit 12 adds 1 to k (Step S6), and determines whether k reaches the updating interval K (Step S7). If k is determined not to reach the updating interval K yet (No in Step S7), the process proceeds to Step S4. On the other hand, if k is determined to reach the updating interval K (Yes in Step S7), the process proceeds to step S8.

In step S8, the determiner 14 updates the decimal point position of each variable of each layer 21 on the basis of various pieces of the statistical information 22. The decimal point position updated in this process is used to express each variable in the next updating interval.

The determiner 14 sets (initializes) k=0 (Step S9), resets the statistical information 22 (step S10), and moves the process to Step S4.

Note that the processing order of steps S1 to S3 is not limited to that of the example of FIG. 22, and any step may be performed first, or these steps may be performed in parallel. The processing order of Steps S9 and S10 is not limited to that of the example of FIG. 22, and any step may be performed first, or these steps may be performed in parallel.

Next, an example of the operation of the process of step S5 of FIG. 22 will now be described. As illustrated in FIG. 23, the learning unit 12 selects the first layer 21 of the forward propagation in the training of the batch (Step S11).

The determiner 34 corrects the decimal point position based on the stored information stored in the information storing unit 15 (Step S12). The correction process may be omitted for the first layer 21 in the CNN 20 forward order, for example, the first (leading) layer 21a in the example of the forward in FIG. 12 (the leading layer 21a in the CNN 20 structure).

The learning unit 12 applies the decimal point position corrected by the determiner 14 to execution the forward propagation calculation of the layer 21 and acquisition of the statistical information 22 (in Step S13).

The determiner 14 calculates the feature values and the difference values for the layer 21 and stores them in the information storing unit 15 as the storage information (Step S14).

The learning unit 12 determines whether the layer 21 (the layer 21p in the example of FIG. 12) being selected is the last layer 22 of the forward propagation (Step S35). If determining the layer 21 not to be the last layer of the forward propagation (No in Step S15), the learning unit 12 selects the next layer 21 in the forward propagation direction and moves the process to Step S12. On the other hand, if determining the layer to be the last layer 21 of the forward propagation (Yes in Step S15), the learning unit 12 selects the first layer 21 of the backward propagation (Step S16).

The determiner 14 corrects the decimal point position based on the stored information stored in the information storing unit 15 (Step S17). The correction process may be omitted for the leading layer 21 of the backward order in the CNN 20, for example, the leading layer 21p in the example of the backward in FIG. 13 (the last layer 21p in the CNN 20 structure).

The learning unit 12 applies the decimal point position corrected by the determiner 14 to execution of the backward propagation calculation of the layer 21 and acquisition of the statistical information 22 (in Step S18).

The determiner 14 calculates the feature values and the difference values for the layer 21 and stores them in the information storing unit 15 as the storage information (Step S19).

The learning unit 12 determines whether the selected layer 21 is the last layer 21 (the layer 21a in the example of FIG. 13) of the backward propagation (Step S20). If determining the layer 21 not to be the last layer of the backward propagation (No in Step S20), the learning unit 12 selects the next layer 21 in the backward propagation direction and moves the process to Step S17. On the other hand, if determining the layer to be the last layer 21 of the backward propagation (Yes in Step S20), the learning unit 12 selects the first layer 21 of the forward propagation (Step S21).

The learning unit 12 updates the weight and the bias of the selected layer 21 and obtains the statistical information 22 on the selected layer 21 (Step S22), and determines whether or not the layer 21 being selected is the last layer 21 (the layer 21p in the example of FIG. 12) of the forward propagation (Step S23). If determining the layer 21 not to be the last layer 21 of the forward propagation (No in Step S23), the learning unit 12 selects the next layer 21 of the forward propagation direction and the process proceeds to Step S22. On the other hand, if determining the layer to be the last layer 21 of the forward propagation (Yes in Step S23), the process ends.

[2] Second Embodiment

Next, the second embodiment will now be described. The second embodiment can be regarded as an embodiment that simplifies the process of the determiner 14 of the first embodiment.

Figure 24:
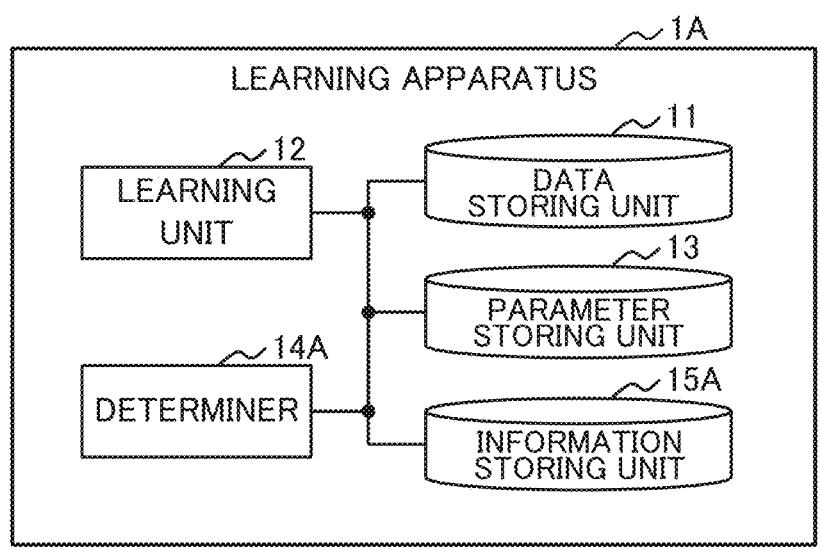
FIG. 24 is a block diagram schematically illustrating an example of the functional configuration of a learning apparatus according to a second embodiment.

FIG. 24 is a block diagram schematically illustrating an example of the functional configuration of a learning apparatus 1A according to the second embodiment. As illustrated in FIG. 24, the learning apparatus 1A includes a determiner 14A and an information storing unit 15A instead of the determiner 14 and the information storing unit 15 included in the learning apparatus 1 of the first embodiment. The description net referred to below is the same as that of the first embodiment.

Unlike the determiner 14, as illustrated in FIG. 25, the determiner 34A stores the feature value and the difference value for the current iteration (one iteration) into the information storing unit 15A.

For example, as illustrated in FIG. 26, the determiner 14A determines the correction value for the layer L based on the storage information of the current iteration t of the layer 21 previous to the layer 21 (the layer L) that starts training.

As an example, the determiner 14A may use the difference value of the leading layer 21 (the layer 21a in the example of FIG. 12) as the correction value of the layer L, or may use the difference value of the leading layer 21 in the block 23 to which the layer L belongs, as illustrated In FIG. 19. Alternatively, the determiner 14A may use the calculation result such as the average or the weighted average of the difference values of the leading block layers 1 to L−1.

The determiner 14A may omit the calculation of the correction value for the first layer 21 in the forward order or the backward order, and may use the updating result of the decimal point position calculated in units of K-times (updating intervals) as performed in the first embodiment.

As described above, the same effects as those of the first embodiment can be achieved by the learning apparatus 1A according to the second embodiment. Further, since the difference value of the current iteration t in the information storing unit 15A is used as the correction value for the decimal point position of the layer L, the similarity determination process can be omitted, and the processing load can be reduced, so that the processing time can be shortened (the speed of the process can be enhanced).

[3] Third Embodiment

Next, a third embodiment will now be described. The third embodiment can be regarded as an embodiment that predicts the correction value for each layer 21 by deep learning.

Figure 27:
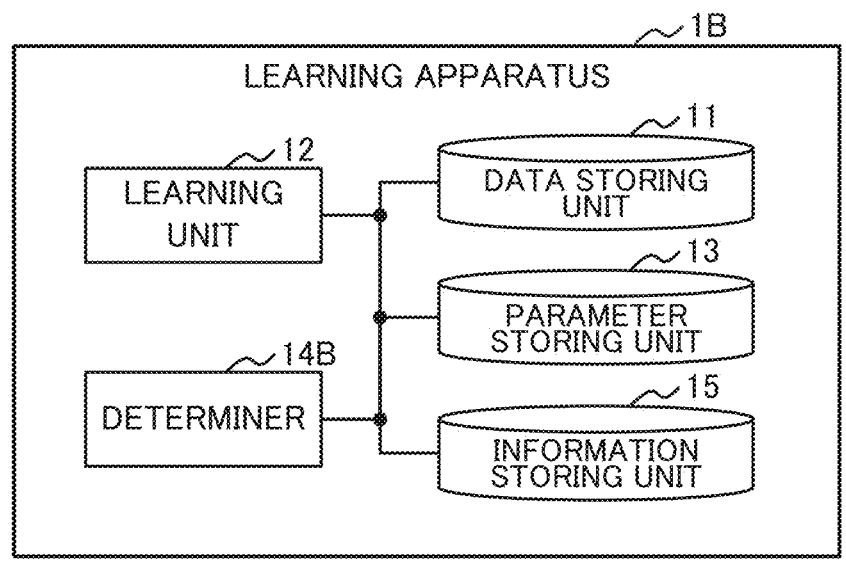
FIG. 27 is a block diagram schematically illustrating an example of the functional configuration of a learning apparatus according to a third embodiment.

FIG. 27 is a block diagram schematically illustrating an example of the functional configuration of a learning apparatus 18 according to the third embodiment. As illustrated in FIG. 27, the learning apparatus 1B includes a determiner 14B instead of the determiner 14 included in the learning apparatus 2 according to the first embodiment. The description net referred to below is the same as that of the first embodiment.

The determiner 14B obtains the correction value for the layer L by deep learning in which the correction value is trained and inferred concurrently with the training of the CNN 20 by the learning unit 12.

As in the first embodiment, the determiner 14B may store the storage information including the feature value including the statistical information 22 of the T-time mini-batches, and the correction value, in other words, the difference value between the current decimal point position and the ideal value, Into the information storing unit 15.

Figure 28:
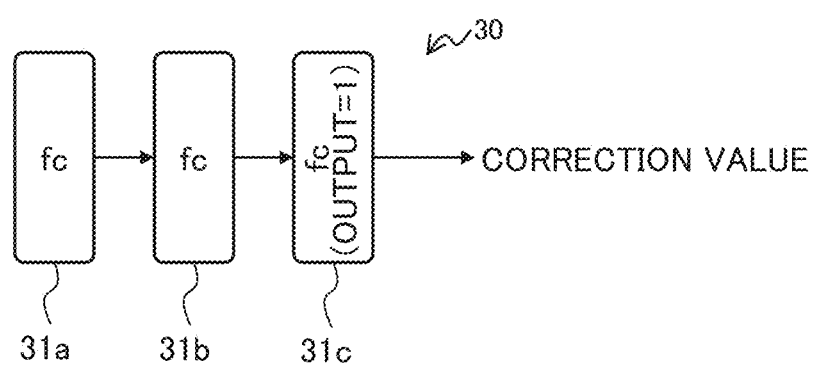
FIG. 28 is a diagram illustrating an example of the network configuration of a predictor.

For example, as illustrated in FIG. 28, the determiner 14B may train a predictor 30, which is an example of a machine learning model for determining a correction value (offset amount). FIG. 28 is a diagram illustrating an example of the network configuration of the predictor 30. As an example, the predictor 30 may have a network configuration of about three layers including layers 31a to 31c. Each of these layers 31 may be a fully connected layer fc.

The determiner 14B may train the predictor 30 each of T-time mini-batches, and may predict the correction value using the predictor 30. A training interval T of the predictor 30 and the updating interval K of the decimal point position in the CNN 20 may have, for example, a relationship of T=K×N (where N is an integer of 1 or more). In other words, T=K does not have to be always satisfied.

In this manner, the determiner 14B trains the predictor 30 by using the data stored in the information storing unit 15 at the training intervals T.

Figure 29:
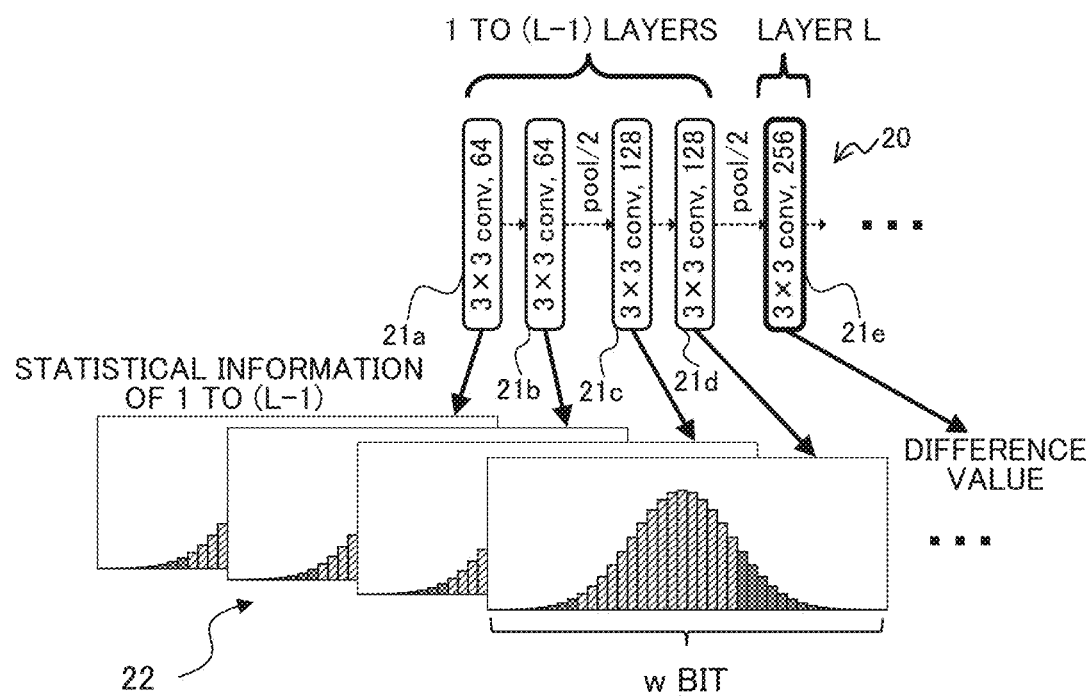
FIG. 29 is a diagram illustrating an example of data for training a predictor.

FIG. 29 is a diagram illustrating an example of training data for a predictor 30.

As illustrated in FIG. 29, in training of the predictor 30, the statistical information 22 of each layer 21 (the layers 1 to L−1) of the CNN 20 may be used as the training data in the case of the layer L. The determiner 14B may use the difference value of the layer L as the correct answer label.

For example, the determiner 14B may train the predictor 30 illustrated in FIG. 28 by using "L−1)×w" pieces of statistical information 22 as training data and using the difference values stored in the information storing unit 15 as the correct answer data of these training data. Here, the symbol (L−1) indicates the number of layers previous to the layer L, and the symbol w indicates the bit width of the statistical information 22. As the statistical information 22, the determiner 14B may use the feature values stored in the information storing unit 15, or may refer to and use the statistical information 22 stored in the accelerator that achieves the CNN 20.

Then, the determiner 14B predicts the correction value of the layer L using the trained predictor 30. For example, the determiner 14B predicts (determines) the correction value for the decimal point position of the layer L by using the statistical information 22 of each layer 21 (the layers 1 to L−1) as an input to the predictor 30 and using the correction value (for example, a real number) as an output from the predictor 30. Note that the determiner 14B may perform a rounding process on the correction value of the real number output from the predictor 30 into an integer number.

Figure 30:
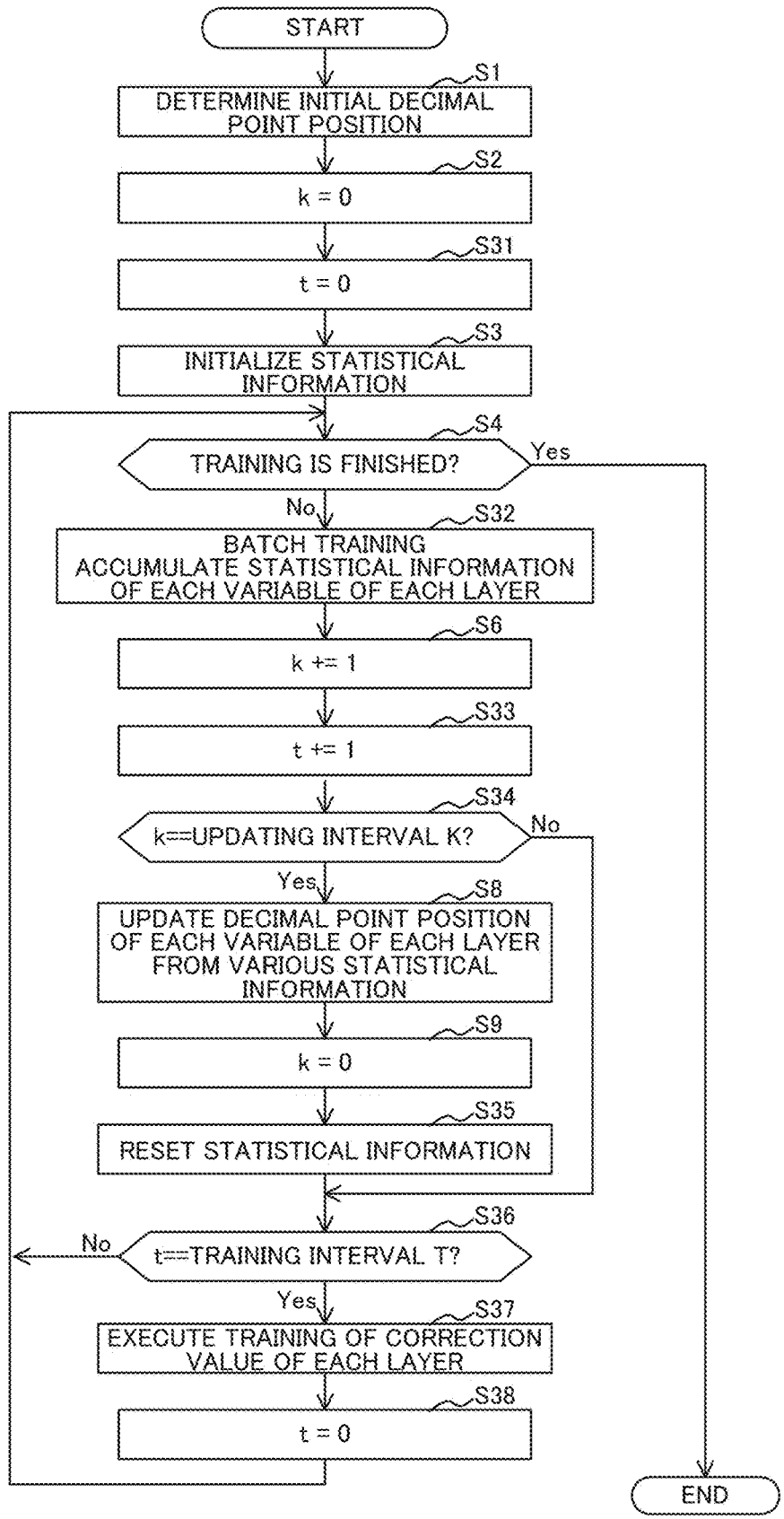
FIG. 30 is a flowchart illustrating an example of the operation of the learning apparatus of the third embodiment.
Figure 31:
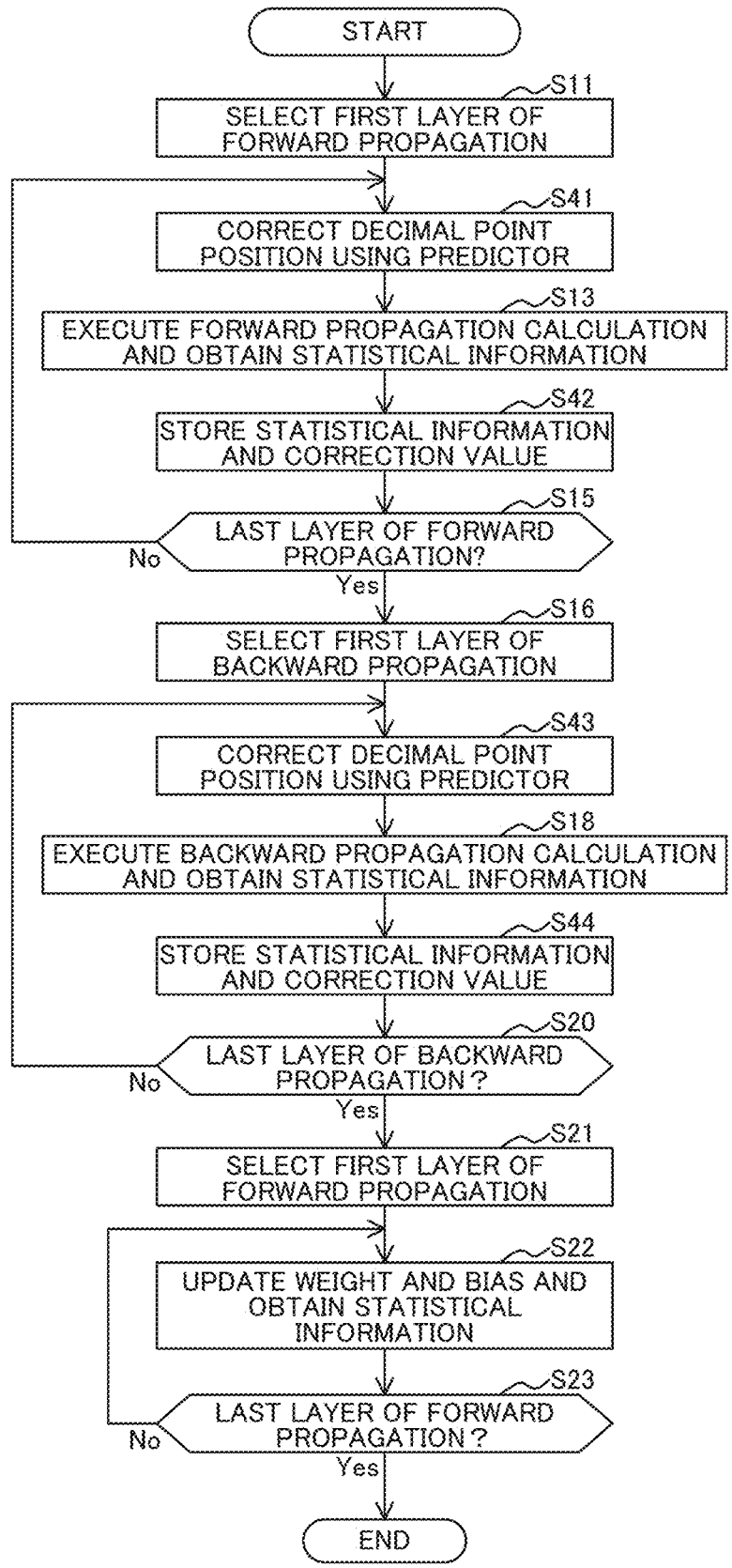
FIG. 31 is a flowchart illustrating an example of the operation of a batch learning process illustrated in FIG. 30.

Next, an example of an operation of the learning apparatus 1B according to the third embodiment will now be described with reference to FIGS. 30 and 31. FIG. 30 is a flowchart illustrating an example of the operation of the learning apparatus 1B according to the third embodiment, and FIG. 31 is a flowchart for explaining an example of the operation of the batch learning process illustrated in FIG. 30. In FIG. 30, the steps provided with the same reference numbers as these in FIG. 22 designate the same steps illustrated in FIG. 22. In FIG. 33, the steps provided with the same reference numbers as those in FIG. 23 designate the same steps illustrated in FIG. 23.

As illustrated in FIG. 30, in Step S31 performed after Step S2, the learning apparatus 1B sets (initializes) t=0, and the process proceeds to step S3.

If No in Step S4, the learning unit 12 carries out training in a batch and accumulates the statistical information 22 of each variable of the layer 21, in Step S32. At this time, the determiner 14B corrects the decimal point position of the layer 21 on the basis of the predictor 30 trained in Step S37, which will be described below.

In step S33 performed after Step S6, the determiner 14B adds 1 to t, and the process proceeds to Step S34.

In Step S34, the learning unit 12 determines whether or not k has reached the updating interval K. If k is determined not to reach the updating interval K yet (No in Step S34), the process proceeds to Step S36. On the other hand, if k is determined to reach the updating interval K (Yes in Step S34), the process proceeds to step S8.

In step S35 performed after Step S9, the determiner 14B resets the statistical information 22, and the process proceeds to Step S36.

After step S35, or in cases of No in Step S34, the determiner 14B determiners whether or not t has reached the training interval T in Step S36. If t is determined not to have reached the training interval T (No in Step S36), the process proceeds to step S4. On the other hand, if t is determined to have reached the training interval T (Yes in Step S36), the process proceeds to Step S37.

In Step S37, the determiner 14B trains the correction value of each layer 23 using the predictor 30, and the process proceeds to Step S38.

In Step S38, the determiner 14B sets (initializes) t=0, and the process proceeds to Step S4.

The processing order of steps S1 to S3 is not limited to that of the example of FIG. 30, and any step may be performed first, or these steps may be performed in parallel. The processing order of steps S6 and S44 is not limited to that of the example of FIG. 30, and any step may be performed first, or these steps may be performed in parallel. Furthermore, the processing order of steps S9 and S35 is not limited to that of the example of FIG. 30, and any step may be performed first, or these steps may be performed in parallel.

Next, an example of the operation of the process of step S32 of FIG. 30 will now be described. As exemplarily illustrated in FIG. 31, after Step S11 or in cases of No in Step S15, the determiner 14B predicts the correction value of the layer 21 based on the predictor 30, corrects the decimal point position using the predicted correction value in Step S41, and the process proceeds to step S13.

In step S42 performed after Step S13, the determiner 14B stores the statistical information 22 and the difference values in the information storing unit 15 as storage information, and the process proceeds to Step S15.

After Step S16 or in cases of No in Step S20, the determiner 14B predicts the correction value of the layer 21 based on the predictor 30, corrects the decimal point position using the predicted correction value in Step S43, and the process proceeds to step S18.

After step S18, in step S44, the determiner 14B stores the statistical information 22 and the difference values in the information storing unit 15 as storage information, and the process proceeds to Step S20.

As described above, the same effects as those of the first and the second embodiments can be achieved by the learning apparatus 1B according to the third embodiment. Further, since the correction value for the decimal point position of the layer L is predicted by using the predictor 30 on the basis of the statistical information 22, the correction value can be determined with higher accuracy as the training of the predictor 30 proceeds.

In the third embodiment, the statistical information 22 of the layer 21 serving as the input data to the predictor 30 may be limited to statistical information 22 of the leading layer 21 or the leading layer 21 of the block 23. Thereby, like the first and second embodiments, the processing load can be reduced, and the processing time can be shortened (the speed of the process can be enhanced).

[4] Example of Hardware Configuration

Figure 32:
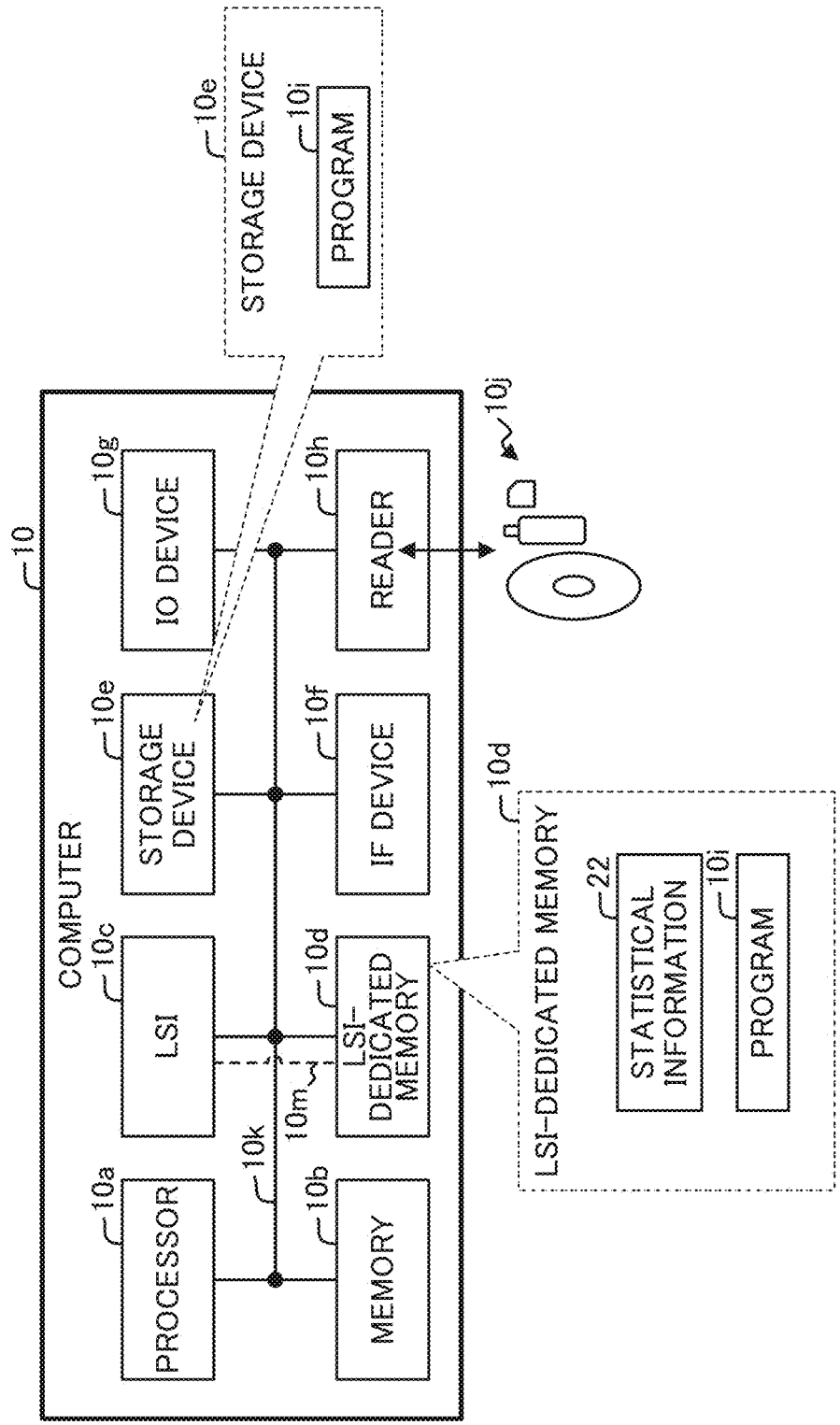
FIG. 32 is a block diagram schematically illustrating an example of a hardware configuration of a computer according to the first to third embodiments.

FIG. 32 is a block diagram illustrating an example of a hardware (HW) configuration of a computer 10. The functions of the learning apparatuses 1, 1A, and 1B according to the first, the second, and the third embodiments may be achieved by HW resources of the computer 10 illustrated in FIG. 32, for example. In cases where multiple computers are used as the HW resource for achieving the functions of the learning apparatuses 1, 1A, and 1B, the computer may have the HW configuration illustrated in FIG. 32.

As illustrated in FIG. 32, the computer 10 exemplarily includes a processor 10a, a memory 10b, a LSI 10c, an LSI-dedicated memory 10d, a storage device 10e, an Interface (I/F) device 10f, an Input/Output (I/O) device 10g, and a reader 10h.

The processor 10a is an example of a processor that performs various controls and calculations. The processor 10a may be communicatively coupled to each of the blocks in the computer 10 via the bus 10k. The processor 10a may be a multiprocessor including multiple processors, may be a multicore processor having multiple processor cores, or may have a configuration having multiple multicore processors.

Examples of the processor 10a include an integrated circuit (IC) such as a Central Processing Unit (CPU), an Micro Processing Unit (MPU), an Accelerated Processing Unit (APU), a Digital Signal Processor (DSP), an Application Specific IC (ASIC), and an Field-Programmable Gate Array (FPGA). The processor 10a may be a combination of two or more of the above ICs.

The memory 10b is an example of the HW that stores information such as various data and programs. An example of the memory 10b includes a volatile memory such as Dynamic Random Access Memory (DRAM).

The LSI 10c is an HW device including a processor for dynamically changing the decimal point position of a fixed-point number and for performing a predetermined process in cooperation with the processor 10a. The LSI 10c may operate under control of the processor 10a via the bus 10k. For example, the LSI 10c may include multiple (e.g., a relatively large number) of product-sum calculators and multiple (e.g., a relatively small number) of special calculators.

As an example, the LSI 10c according to the first to the third embodiments may execute processes such as training and inferring of the CNN 20 in response to an instruction (control) from the processor 10a operating as the learning unit 12.

The LSI 10c may include a control cores (not illustrated). In this case, for example, the processor 10a and the control core may perform a communication process via the bus 10k, and the control core that Obtains the control information output from the processor 10a may control the entire LSI 10c.

Examples of the LSI 10c include one or more of Graphics Processing Units (GPUs), one or more FPGAs, and one or more ASICs, or two or more combinations thereof. The above-described operation processing apparatus may be regarded as one including an LSI 10c in addition to the processor 10a. In other words, the processor 10a and the LSI 10c serve as the learning apparatus 1, 1A, or 1B as an example of a calculation operation processing apparatus for performing calculations such as training and inferring the CNN 20.

The LSI-dedicated memory 10d may store, for example, control data (control information) directed to the LSI 10c and input/output data used for calculations of the LSI 10c, and may include, for example, a memory such as a DRAM, and a register. The statistical information 22 of the first to the third embodiments may be stored, as the statistical information 22, in the LSI-dedicated memory 10d. Alternatively, the statistical information 22 may be stored in an internal register of the LSI-dedicated memory 10d, for example. The LSI-dedicated memory 10d may be directly connected to a bus (communication line) indicated by a reference number 10m. In this alternative, the LSI-dedicated memory 10d do not have to be connected to the bus 10k.

The storage device 10e is an example of the HW that stores information such as various data and programs. Examples of the storage device 10e are various storing devices exemplified by a magnetic disk device such as a Hard Disk Drive (HDD), a semiconductor drive device such as a Solid State Drive (SSD), and a nonvolatile memory.

Examples of the nonvolatile memory include a flash memory, a Storage Class Memory (SCM), and a Read Only Memory (ROM).

The storage device 10e may store a program 10i (control program) that implements all or part of various functions of computer 10. The program 10i may include, for example, processes that implements the learning unit 12 and the determiner 14, 14A, or 14B. The processor 10a of the learning apparatus 1, 1A, or 1B operates as the learning apparatus 1, 1A, or 1B by expanding the program 10i stored in the storage device 10e onto the memory 10b or the LSI-dedicated memory 10d and executing each of the processes that program 10i has.

The data storing unit 11, the parameter storing unit 13, and the information storing unit 15 or ISA included in the learning apparatuses 1, 1A, and 1B may be achieved by at least part of the storing region of the memory 10b, the LSI-dedicated memory 10d, and the storage device 10e, for example.

The IF device 10f is an example of a communication IF that controls, for example, the connection and the communication with a non-illustrated network such as an internet. For example, the IF device 10f may include adapters compliant with a Local Area Network (LAN), optical communication (e.g., Fibre Channel (FC)), or the like. The adapter may deal with one or both of wireless and wired communication schemes. For example, the program 10i may be downloaded from a non-illustrated network to the computer 10 via the communication IF and stored in the storage device 10e.

The I/O device 10c includes one or both of an input device and an output device. Examples of the input device include a keyboard, a mouse, and a touch panel. Examples of the output device include a monitor, a projector, and a printer.

The reader 10h is an example of a reader that reads data and programs recorded on the recording medium 10j. The reader 10h may include a connecting terminal or device to which the recording medium 10j can be connected or inserted. Examples of the reader 10h include an adapter conforming to, for example. Universal Serial Bus (USB), a drive apparatus that accesses a recording disk, and a card reader that accesses a flash memory such as an SD card. The recording medium 10j may store the program 10i, and the reader 10h may read the program 10i from the recording medium 10j and store the program 10i into in the storage device 10e.

The recording medium 10j is an exemplary non-transitory computer-readable recording medium such as a magnetic/optical disk, and a flash memory. Examples of the magnetic/optical disk include a flexible disk, a Compact Disc (CD), a Digital Versatile Disc (DVD), a Blu-ray disk, and a Holographic Versatile Disc (HVD). An examples of the flash memory includes a semiconductor memory such as a USB memory and an SD card.

The above HW configuration of the computer 10 is a merely example. Accordingly, the computer 10 may appropriately undergo Increase or decrease of hardware blocks (e.g., addition or deletion of arbitrary blocks), division, integration in an arbitrary combination, and addition or deletion of the bus. For example, in the learning apparatus 1, 1A, or 1B at least one of the I/O device 10g and the reader 10h may be omitted.

[5] Miscellaneous

The techniques according to the first to the third embodiments described above can be modified and implemented as follows.

For example, the blocks of the learning apparatus 1, 1A, or 1B illustrated in FIG. 1, 24, or 27, respectively may be merged in any combinations, or may be divided in each case.

In one aspect, it is possible to suppress a decrease in accuracy of a learning result of a machine learning model.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An arithmetic processing apparatus comprising:
a memory that, stores, when a training of a given machine learning model is repeatedly performed in a plurality of iterations, an error of a decimal point position of each of a plurality of fixed-point number data obtained one in each of the plurality of iterations, the error being obtained based on statistical information related to a distribution of leftmost set bit positions for positive number and leftmost unset bit positions for negative number or a distribution of rightmost set bit positions of the plurality of fixed-point number data; and
a processor coupled to the memory,
the processor being configured to:
determine, based on a tendency of the error in each of the plurality of iterations, an offset amount for correcting a decimal point position of fixed-point number data used in the training.

2. The arithmetic processing apparatus according to claim 1, wherein:
the machine learning model is a neural network comprising a plurality of layers; and
the memory stores the error for each of the plurality of layers included in the neural network; and
the processor determines the offset amount for each of the plurality of layers.

3. The arithmetic processing apparatus according to claim 2, wherein the processor determines the offset amount of a first layer based on the error of a second layer previous to the first layer, the error being stored in the memory.

4. The arithmetic processing apparatus according to claim 3, wherein the processor is further configured to:
specify an x-th iteration being previous to a t-th iteration (where, t is an integer of 2 or more, and x is an integer less than t) and being similar in a tendency of the error to the t-th iteration of the training for the second layer, and wherein
the processor determines, based on an error of the x-th iteration of the first layer, an offset amount of the t-th iteration for the first layer.

5. The arithmetic processing apparatus according to claim 3, wherein the processor is further configured to:
train a machine learning model for determining an offset amount, using the statistical information of the second layer and the error of the first layer, and wherein
the processor determines the offset amount of the first layer based on a learning result of the machine learning model for determining the offset amount.

6. The arithmetic processing apparatus according to claim 3, wherein:
the memory stores a feature value obtained from the statistical information in each of the plurality of iterations in association with each other; and
the processor determines the offset amount of the first layer, based on a combination of the error and the feature value of the second layer stored in the memory.

7. The arithmetic processing apparatus according to claim 3, wherein the second layer is one of or a combination of two or more of layers from a leading layer to a layer previous one to the first layer in the neural network.

8. The arithmetic processing apparatus according to claim 3, wherein the second layer is a leading layer in the neural network.

9. The arithmetic processing apparatus according to claim 3, wherein the second layer is a leading layer in a block that the first layer belongs to among a plurality of blocks obtained by dividing the plurality of layers in a unit of two or more successive layers.

10. The arithmetic processing apparatus according to claim 3, wherein the second layer is one of or a combination of two or more of layers from a leading layer to a layer previous one to the first layer in a block that the first layer belongs to among a plurality of blocks obtained by dividing the plurality of layers in a unit of two or more successive layers.

11. A non-transitory computer-readable recording medium having stored therein a control program causing a computer to execute a process comprising:
storing, when a training of a given machine learning model is repeatedly performed Ln a plurality of iterations, an error of a decimal point position of each of a plurality of fixed-point number data obtained one in each of the plurality of iterations, the error being obtained based on statistical information related to a distribution of leftmost set bit positions for positive number and leftmost unset bit positions for negative number or a distribution of rightmost set bit positions of the plurality of fixed-point number data, into a memory; and
determining, based or a tendency of the error in each of the plurality of iterations, an offset amount for correcting a decimal point position of fixed-point number data used in the training.

12. The non-transitory computer-readable recording medium according to claim 11, wherein:
the machine learning model is a neural network comprising a plurality of layers; and
the process further comprises:
storing the error for each of the plurality of layers included in the neural network into the memory; and
determining the offset amount for each of the plurality of layers.

13. The non-transitory computer-readable recording medium according to claim 12, the process further comprising determining the offset amount of a first layer based on the error of a second layer previous to the first layer, the error being stored in the memory.

14. The non-transitory computer-readable recording medium according to claim 13, the process further comprising:
specifying an x-th iteration being previous to a t-th iteration (where, t is an integer of 2 or more, and x is an integer less than t) and being similar in a tendency of the error to the t-th iteration of the training for the second layer, and wherein
determining, based on an error of the x-th iteration of the first layer, an offset amount of the t-th iteration for the first layer.

15. The non-transitory computer-readable recording medium according to claim 13, the process further comprising
training a machine learning model for determining an offset amount, using the statistical information of the second layer and the error of the first layer, and wherein
determining the offset amount of the first layer based on a learning result of the machine learning model for determining the offset amount.

16. The non-transitory computer-readable recording medium according to claim 13, the process further comprising:
storing a feature value obtained from the statistical information in each of the plurality of iterations into the memory in association with each other; and
determining the offset amount of the first layer, based on a combination of the error and the feature value of the second layer stored in the memory.

17. A control method that causes a computer to execute a process comprising:
storing, when a training of a given machine learning model is repeatedly performed in a plurality of iterations, an error of a decimal point position of each of a plurality of fixed-point number data obtained one in each of the plurality of iterations, the error being obtained based on statistical information related to a distribution of leftmost set bit positions for positive number and leftmost unset bit positions for negative number or a distribution of rightmost set bit positions of the plurality of fixed-point number data, into a memory; and
determining, based on a tendency of the error in each of the plurality of iterations, an offset amount for correcting a decimal point position of fixed-point number data used in the training.

18. The control method according to claim 17, wherein:
the machine learning model is a neural network comprising a plurality of layers; and
the process further comprises:
storing the error for each of the plurality of layers included in the neural network into the memory; and
determining the offset amount for each of the plurality of layers.

19. The control method according to claim 18, the process further comprising determining the offset amount of a first layer based on the error of a second layer previous to the first layer, the error being stored in the memory.

20. The control method according to claim 19, the process further comprising:
specifying an x-th iteration being previous to a t-th iteration (where, t is an integer of 2 or more, and x is an integer less than t) and being similar in a tendency of the error to the t-th iteration of the training for the second layer, and wherein
determining, based on an error of the x-th iteration of the first layer, an offset amount of the t-th iteration for the first layer.

21. The control method according to claim 19, the process further comprising
training a machine learning model for determining an offset amount, using the statistical information of the second layer and the error of the first layer, and wherein determining the offset amount of the first layer based on a learning result of the machine learning model for determining the offset amount.

* * * * *